United States Patent [19]
Nakai et al.

[11] Patent Number: 5,996,375
[45] Date of Patent: Dec. 7, 1999

[54] METHOD OF MAKING AN OPTICAL WAVEGUIDE GRATING WITH TWO DISSIMILAR IRRADIATING STEPS

[76] Inventors: Michihiro Nakai, C-305; Kensuke Shima, B202, both of Matsugaoka-shataku, 188-33, Jo, Sakura-shi; Hiroshi Hidaka, C-102, 1531-7, Yotsukaido, Yotsukaido-shi; Satoshi Okude, B-105; Masaaki Sudoh, A-309, both of Matsugaoka-ryo, 188-4, Jo, Sakura-shi; Tetsuya Sakai, 706, 1-3-1, Miyanodai, Sakura-shi; Akira Wada, 610 Moa-Crest Alphas Sakura, 121-1 Tamachi, Sakura-shi; Ryozo Yamauchi, 3-11, Miyamae 2-chome, Sakura-shi, all of Chiba-ken, Japan

[21] Appl. No.: 08/837,958

[22] Filed: Apr. 14, 1997

[30] Foreign Application Priority Data

| Apr. 19, 1996 | [JP] | Japan | 8-098879 |
| Apr. 19, 1996 | [JP] | Japan | 8-098880 |
| May 16, 1996 | [JP] | Japan | 8-121973 |

[51] Int. Cl.$^6$ .................................................. C03B 37/10
[52] U.S. Cl. .............................. 65/392; 65/425; 430/290; 430/321
[58] Field of Search ........................ 65/392, 425; 385/10, 385/37; 430/290, 321

[56] References Cited

U.S. PATENT DOCUMENTS

| 5,066,133 | 11/1991 | Brienza . | |
| 5,104,209 | 4/1992 | Hill et al. . | |
| 5,309,260 | 5/1994 | Mizrahi et al. . | |
| 5,367,588 | 11/1994 | Hill et al. . | |
| 5,400,422 | 3/1995 | Askins | 385/10 |
| 5,502,786 | 3/1996 | Inniss | 385/37 |
| 5,633,966 | 5/1997 | Nakaishi | 385/37 |
| 5,652,818 | 7/1997 | Byron . | |
| 5,675,691 | 10/1997 | Edlinger | 430/290 |
| 5,694,502 | 12/1997 | Byron | 385/37 |
| 5,745,617 | 4/1998 | Starodubov | 430/290 |
| 5,817,537 | 10/1998 | Bodere | 430/321 |

FOREIGN PATENT DOCUMENTS 2289770 of 0000 United Kingdom .

OTHER PUBLICATIONS

Electronics Letters, vol. 30, No. 16, Aug. 4, 1994, pp. 1341–1342, "Fabrication and Characterisation of Long, Narrowband Fibre Gratings By Phase Mask Scanning."

Electronics Letters, vol. 30, No. 10, May 12, 1994, pp. 811–812, "Novel Writing Technique Of Long and Highly Reflective In–Fibre Gratings."

Optical Fiber Technology, vol. 1, No. 1, Oct. 1, 1994, pp. 17–34, "Photosensitive Optical Fibers: Devices and Applications."

IEEE Photonics Technology Letters, vol. 5, No. 2, Feb. 1, 1993, pp. 191–194, "Laser–Trimmed Four–Port Bandpass Filter Fabricated in Single–Mode Photosensitive GE–Doped Planar Waveguide."

Fabrication and characterisation of long, narrowband fibre gratings by phase mask scanning, Electronics Letters, vol. 30, No. 16, pp. 1341–1342 (1994).

Fibre mode converters: point–by–point fabrication of index gratings, visualization using thermoluminescence and applications, OFC '91, WL3 (1991) p. 109, Malo.

Long period fiber–grating–based gain equalizers, Optics Letters, vol. 21, No. 5, pp. 336–338 (1996).

*Primary Examiner*—John Hoffmann

[57] ABSTRACT

A method of producing an optical waveguide grating by exposure to light. An optical waveguide having a core composed of a material wherein the refractive index changes due to exposure to UV light is formed into an optical waveguide grating by applying a grating portion formation step wherein a grating portion is formed by irradiation with UV light at a predetermined spacing, and an overall exposure step after formation of the grating portion wherein the entire grating portion is irradiated with UV light. As a result, the effective refractive index of the grating portion is changed so as to allow the central wavelength to be adjusted without changing the rejection. Consequently, the grating properties can be precisely and easily controlled.

4 Claims, 16 Drawing Sheets

1553.89  1556.89
3nm
WAVELENGTH (nm)

METHOD OF MAKING AN OPTICAL WAVEGUIDE GRATING WITH TWO DISSIMILAR IRRADIATING STEPS

BACKGROUND OF THE INVENTION

1. Field of the Invention

The present invention relates to optical waveguide gratings and production methods therefor.

2. Description of the Related Art

Optical waveguide gratings can be obtained by making regular periodic changes, such as periodic changes in the refractive index of the core, along the longitudinal direction of optical fibers or planar optical waveguides.

In general, gratings can be divided into radiative mode-coupled types and reflective mode-coupled types. Radiative mode-coupled gratings are capable of attenuating light of specific wavelengths due to radiation from the optical waveguide by coupling modes propagating in the core with modes propagating in the cladding. Reflective mode-coupled gratings reflect light of specific wavelengths by coupling modes propagating through the core in a positive direction and modes propagating through the core in the opposite direction (negative direction).

For example, in the case of optical fiber gratings formed by making periodic changes in the core refractive index of optical fibers, radiative gratings are obtained by making the period of the changes in the core refractive index (hereinafter sometimes referred to as the grating pitch) approximately several hundred microns, and reflective gratings are obtained by making the grating pitch approximately 1 micron.

Radiative mode-coupled gratings have wavelength-transmission loss properties (transmission spectra) as shown in FIG. 4, wherein the transmission loss of light in a specific wavelength band is selectively increased. The width of the wavelength band with an increased transmission loss is referred to as the rejection bandwidth, the central wavelength thereof is referred to as the central wavelength of the rejection band, and the magnitude of the change in transmission loss is referred to as the rejection.

Wavelength-transmission loss properties (transmission spectra) similar to those of FIG. 4 can also be obtained by reflective mode-coupled gratings.

These grating properties of optical waveguide gratings are known to change with the parameters of the gratings, i.e. the amount of change in the core refractive index, the grating pitch, the grating shape (profile of the core refractive index), the grating length in the longitudinal direction of the optical fiber, and the effective refractive index.

The following Table 1 summarizes the influence that each parameter of a grating has on the grating properties. In the table, x indicates no influence, ○ indicates some influence, and Δ indicates a small influence. Additionally, the arrows ↑ (↓) indicate whether the value of the cladding property will increase (decrease) in response to an increase in the parameter value.

Precise control of the central wavelength and the rejection are important when using the optical waveguide gratings as optical components in optical communication systems.

TABLE 1

| PARAMETER | Central Wavelength | Rejection | Rejection Bandwidth |
|---|---|---|---|
| Change in Refractive Index | ○↑ | ○↑ | x |
| Grating Pitch | ○↑ | Δ | x |
| Grating Shape | ○ | ○ | x |
| Grating Length | x | ○↑ | ○↓ |
| Effective Refractive Index | ○↑ | x | x |

As conventional methods for making periodic changes in the core refractive index of optical waveguide gratings, there are methods which take advantage of the properties of silica glass doped with germanium, of which the refractive index will increase when exposed to strong UV radiation, depending on the amount of exposure.

For example, methods are known wherein a silica glass based optical fiber having a core doped with germanium oxide is hydrogenated in a hydrogen-pressurized container (at 100 atm), and then either exposed to UV radiation at a constant period along the longitudinal direction of the optical fiber using a photomask, or exposed to UV radiation at regularly spaced intervals along the longitudinal direction of the optical fiber.

FIG. 7 shows an example of a conventional optical fiber grating production apparatus.

In the drawing, reference numeral 11 denotes an excimer laser, which can generate UV light having a wavelength of 248 nm. Reference numeral 12 denotes an optical system, which is constructed to increase the spot size of the UV light emitted from the laser 11 to a predetermined size on the order of millimeters to tens of millimeters. Reference numeral 13 denotes a metallic mask, having slits which are cut at regularly spaced intervals on the order of tens to hundreds of microns. Reference numeral 14 denotes an anchoring block to which is anchored an optical fiber 1 having the jacket layer 4 partially removed. The UV light emitted from the laser 11 is directed by the optical system 12 through the mask 13 so as to irradiate the portion of the optical fiber 1 with the jacket layer 4 removed.

In order to make an optical fiber grating using an apparatus having this type of structure, the UV light should be emitted from the laser 11 so as to irradiate the optical fiber 1 through the mask 13. As a result, the core refractive index is raised at only the portions of the optical fiber 1 which have been exposed to UV light, so as to form a grating portion 5 in which the core refractive index periodically changes.

However, while this conventional production method requires the grating properties to be controlled by means of the shape of the mask 13 and the UV light irradiation conditions, such control is complicated because the central wavelength and the rejection cannot be independently controlled.

For example, with the above-mentioned production method, it is necessary to find the optimum combination for the shape of the mask 13 (grating pitch, grating shape) and the UV light irradiation conditions (UV light intensity, irradiation time) before forming the grating portion. In order to determine the shape of the mask 13 to use, a number of different irradiation conditions are tried on a first mask 13, and if the desired central wavelength and rejection are not able to be obtained, then the shape of the mask 13 is changed and the irradiation conditions are tried on the new mask. This process of trial and error must be repeated many times, so that a lot of time is expended in order to select the shaped of the mask 13 and the irradiation conditions.

Particularly in the case of radiative mode-coupled gratings, several masks must be used in order to adjust the central wavelength and rejection to their desired values because the amount of change in the central wavelength is large in comparison to the amount of change in the core refractive index.

Additionally, the monitoring of the transmission properties during the UV light irradiation process is difficult because the amount of change in the refractive index changes over time, i.e. the transmission properties (central wavelength and rejection) change over time, until the hydrogen is removed by dehydrogenation.

Furthermore, it is impossible to irradiate the mask with a uniform UV beam because the spatial distribution of the intensity of a laser beam is not uniform, i.e. the laser beam intensity within the spot of a laser is non-uniform. For this reason, the core refractive index change in each part of the grating portion 5 cannot be made uniform, so as to make the transmission spectra of the optical fiber gratings broader or asymmetric, thereby degrading the grating properties.

FIG. 8 shows another example of a conventional optical fiber grating production apparatus. The elements which are identical to those in FIG. 7 are given the same reference numerals and their explanations will be omitted below.

Reference numeral 22 denotes an optical system which is constructed so as to converge the UV light emitted from the laser 11 to a predetermined spot size on the order of tens to hundreds of microns. Reference numeral 24 denotes a mobile stage to which is affixed an optical fiber 1 having the jacket layer 4 partially removed. The mobile stage 24 is controlled so as to be capable of jogging by predetermined distances along the longitudinal direction of the optical fiber. The UV beam emitted from the laser 11 passes through the optical system 12 to irradiate the portion of the optical fiber 1 having the jacket layer 4 removed.

In order to produce an optical fiber grating using an apparatus of this structure, a UV beam is first emitted from the laser 11 for irradiation of the optical fiber 1. After irradiation for a standard period of time, the mobile stage 24 is jogged in order to shift the optical fiber 1 in the longitudinal direction by a predetermined distance, then the optical fiber 1 is once again exposed to the UV beam for a standard period of time. This process of irradiation with the UV beam followed by shifting of the optical fiber 1 is repeated until the total distance by which the optical fiber 1 has shifted has reached a predetermined distance, thereby completing the process. In this way, the grating portion 5 can be formed because the core refractive index is changed at only the portions of the optical fiber 4 which are exposed to the UV beam.

According to this method, the core refractive index change in the grating portion 5 can be made uniform by repeatedly duplicating UV beam irradiation under identical irradiation conditions. However, since the grating pitch is determined by the spot size of the laser beam and the shifting pitch of the optical fiber 1, the spot size of the laser beam and the shifting pitch of the optical fiber 1 must be changed in order to change the grating pitch. While the spot size of the laser beam can be changed by using slits, lenses, or a combination of these, it is difficult to precisely control the spot size by means of any of these methods. Therefore, there is a drawback in that a complicated process of finding the laser beam irradiation conditions is required in order to change the grating properties, thus making design changes difficult.

On the other hand, reflective mode-coupled gratings can achieve wavelength-reflected optical intensity loss properties (reflection spectra) such as shown in FIG. 20, wherein the reflected optical intensity of light in a specific wavelength band is selectively increased. The width of this wavelength band with an increased reflected optical intensity is referred to as the reflection bandwidth, of which the central wavelength is referred to as the central wavelength of the reflection band, and the proportion of the reflected optical intensity with respect to the incident optical intensity is referred to as the reflection.

These grating properties are known to change according to the parameters of the grating such as the amount of change in the core refractive index, the grating pitch, the grating shape (profile of core refractive index change) the grating length along the longitudinal direction of the optical fiber, and the effective refractive index. The effective refractive index is a refractive index which is locally averaged along the longitudinal direction and the transversal direction of the core of the optical fiber, which can be experimentally determined by the following relation: $2\pi/\Lambda$·effective refractive index=propagation constant at central wavelength of reflection band (wherein $\Lambda$ is the grating pitch).

In this case, "locally along the longitudinal direction of the optical fiber" signifies a region having a length of about a single period of the grating.

FIG. 21 shows a closeup of the relevant portions when using a phase mask with the method shown in FIG. 7.

For example, one known method for making a reflective mode-coupled grating is to hydrogenate a silica optical fiber 31 having a core 31a doped with germanium oxide in a hydrogen-pressurized container (at 100 atm), then to expose the optical fiber 31 to a UV beam 34 via a phase mask 32 composed of a silica glass plate having a plurality of slits formed therein at regular intervals. According to this method, when the UV beam 34 is orthogonally incident on the top surface of the phase mask 32, the diffracted light forms an interference pattern. This interference pattern causes periodic changes in the intensity of the UV beam 34 irradiating the optical fiber 31, so as to form a grating portion 310 having periodic changes in the refractive index of the core 31a.

As another technique for making reflective mode-coupled gratings, there is a technique referred to as apodization, wherein the core refractive index change is gradually varied along the longitudinal direction of the optical fiber 31. For example, if the change in the core refractive index at the grating portion 310 due to exposure to the UV beam 34 is constant along the longitudinal direction of the optical fiber 31, then anomalous ripples will occur around the central wavelength in the reflection spectrum as shown in FIG. 22. Apodization is a process for preventing the occurrence of these anomalous ripples by varying the core refractive index change in the grating portion 310 along the longitudinal direction of the optical fiber 31 so as to outline the curve shown in FIG. 23, instead of making the core refractive index change constant along the longitudinal direction of the optical fiber 31. In the graph of FIG. 23, the solid lines indicate the core refractive index change along the longitudinal direction of the optical fiber 31 and the dashed curve indicates the distribution of the core refractive change along the longitudinal direction of the optical fiber 31.

The shape of the distribution of the core refractive index change can be made into a variety of shapes without being restricted to the example of FIG. 23, and the reflection properties of the reflective mode-coupled gratings are known to change depending on the differences in the shape of the distribution of the core refractive index change (see BSTJ., vol. 55, pp. 109–126, 1976, "Filter Response of Nonuniform Almost-periodic Structures", H. Kogelnik et al.).

Specifically, as methods for performing apodization during the formation of the grating portions such as the method wherein the grating portions are formed by using a phase mask 32 as explained above, there is a method wherein the UV beam is shifted along the optical fiber 31 while changing the irradiation intensity of the UV beam 34, or a method wherein the optical fiber 31 and phase mask 32 are shifted in the longitudinal direction of the optical fiber 31 while changing the irradiation intensity of the UV beam 34 and holding the UV beam 34 stationary.

However, in the case wherein the UV beam 34 is moved, the structure of the optical system in the production apparatus becomes complicated, so that the costs required for production such as those for temperature and humidity regulation rise and it becomes extremely difficult to shift the UV beam 34 with precision.

On the other hand, in the case wherein the optical fiber 31 and the phase mask 32 are moved, the optical fiber 31 and phase mask 32 are affected by the vibrations of drive devices such as motors. Particularly when forming the grating portion using a phase mask 32, the positional precision of the phase mask 32 and the optical fiber 31 must be in submicron units. For this reason, when the optical fiber 31 and the phase mask 32 are moved, extreme care is necessary in order to stabilize them to prevent mutual displacement of their relative positions, thus requiring the use of expensive fixation devices and increasing the number of production steps.

SUMMARY OF THE INVENTION

A first object of the present invention is to allow the production of optical waveguide gratings while precisely and easily controlling the grating properties.

A second object of the present invention is to allow the production of radiative mode-coupled optical waveguide gratings while making the core refractive index change over the entire grating portion constant and simplifying the introduction of design modifications.

A third object of the present invention is to simplify the process of apodization during the production of reflective mode-coupled optical waveguide gratings.

In order to achieve the above-mentioned objects, a first aspect of the present invention offers a method of producing optical waveguide gratings comprising a grating portion formation step of forming a grating portion in an optical waveguide having a core composed of a material with a refractive index which changes when exposed to UV light by irradiating the optical waveguide with a UV beam at predetermined spacings; and an overall exposure step of irradiating the entire grating portion with a UV beam after formation of the grating portion.

A second aspect of the present invention offers a method of producing radiative mode-coupled optical waveguide gratings comprising a step of irradiating an optical waveguide having a core composed of a material with a refractive index which changes when exposed to UV light with a UV beam through a mask having slits for transmitting light at predetermined spacings while shifting the UV beam irradiation position along the core.

A third aspect of the present invention offers a method of producing optical waveguide gratings comprising a grating portion formation step of a grating portion formation step of forming a grating portion in an optical waveguide having a core composed of a material with a refractive index which changes when exposed to UV light by irradiating the optical waveguide with a UV beam from a UV light source, wherein the UV beam exposure time of the optical waveguide is varied along the longitudinal direction of the optical waveguide during the grating portion formation step by positioning a shielding plate between the optical waveguide and the UV light source and moving the shielding plate while irradiating with the UV beam.

The present invention offers the following merits.

According to the first aspect of the present invention, the effective refractive index in the grating portion is changed by exposing the entire grating portion to UV light so as to allow the central wavelength to be adjusted without changing the rejection. Consequently, the grating properties can be precisely and easily controlled.

Additionally, since the central wavelength can be adjusted after the grating portion has been formed, the precision required in the production conditions determined prior to formation of the grating portion can be eased in comparison to conventional methods wherein all of the properties are controlled prior to formation of the grating portion. Therefore, the work needed to find the optimum production conditions which expends a lot of time in conventional methods can be markedly reduced, while improving the production efficiency and cutting production costs.

Additionally, the optical waveguide can be hydrogenated prior to the grating portion formation step, and dehydrogenated after formation of the grating portion and before the overall exposure step.

As a result, the grating portion can be efficiently formed, while allowing the rejection and central wavelength of the grating to be controlled with a high degree of precision and preventing the grating properties from changing over time after the optical waveguide grating has been completed, thus allowing optical waveguide gratings with exceptional reliability to be obtained.

According to the second aspect of the present invention, it is possible to obtain a grating wherein the core refractive index change along the longitudinal direction of the optical fiber is constant, even if the intensity of the UV beam used for irradiation is spatially nonuniform.

Additionally, the grating shape can be adjusted to any arbitrary shape by controlling the speed of movement of the irradiation position.

Furthermore, design modifications are easily made because the grating pitch and grating length can be modified by changing the shape of the mask.

Additionally, since the intensity of the UV beam used for irradiation can be nonuniform, it is possible to use substantially all of the UV light emitted from the light source for irradiation of the mask and the optical waveguide. Consequently, the energy efficiency can be made extremely high, and the time required for grating production can be shortened.

According to the third aspect of the present invention, apodization can be easily performed by means of a simple procedure of moving a shielding plate while irradiating with the UV beam during formation of the grating portion. Consequently, it is possible to suppress the occurrence of anomalous ripples and to obtain a reflective optical fiber grating with exceptional properties.

Additionally, it is possible to have an overall exposure step of irradiating the entire grating portion with a UV beam after formation of the grating portion after the grating portion formation step, and to vary the UV beam exposure time of the optical waveguide along the longitudinal direction of the optical waveguide during the overall exposure step by positioning a second shielding plate between the optical waveguide and the UV light source and moving the second shielding plate while irradiating with the UV beam.

As a result, the effective refractive index in the grating portion can be easily made uniform after the grating portion has been formed while performing apodization of the grating. Consequently, the occurrence of anomalous ripples caused by nonuniformities of the effective refractive index can be prevented, and the properties of the reflective optical fiber grating can be improved.

The reflective mode-coupled optical waveguide gratings formed by the above method are optical waveguide gratings comprise a core wherein the refractive index locally averaged in the longitudinal direction of the optical waveguide is constant along the longitudinal direction of the optical waveguide.

With an optical waveguide grating having this type of structure, the grating properties can be improved dramatically by suppressing the occurrence of ripples in the rejection band.

PREFERRED EMBODIMENTS OF THE INVENTION

Figure 1A:
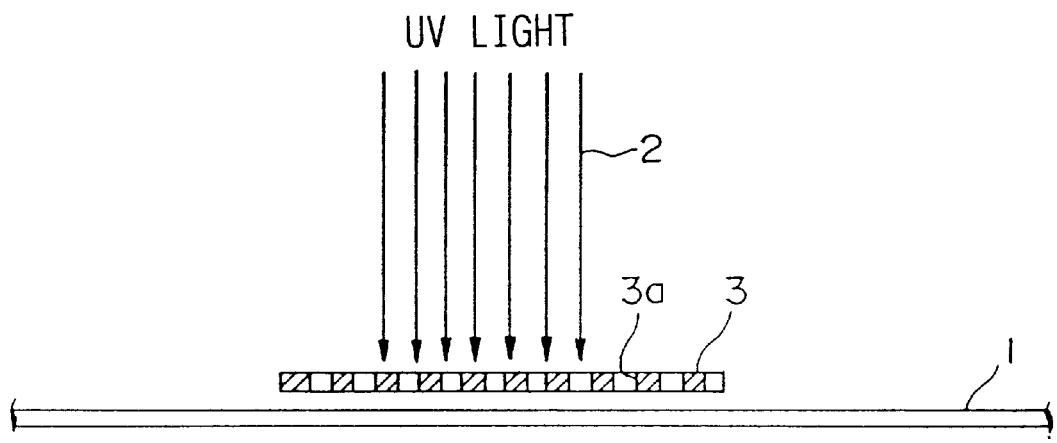
FIG. 1A is a diagram showing a grating portion formation step in a production method according to a first embodiment of the present invention.

Hereinbelow, a first embodiment for resolving the first problem, a second embodiment for resolving the second problem, and a third embodiment for resolving the third problem of the present invention will be explained in detail.

<First Embodiment>

FIG. 1 is a diagram for explaining an example of the order of steps in a method for producing optical waveguide gratings according to a first embodiment of the present invention. FIGS. 2A and 2B are graphs showing examples of the core refractive index profiles of the grating portions according to the first embodiment, of which FIG. 2A shows the core refractive index profile immediately after formation of the grating portion and FIG. 2B shows the core refractive index profile of a completed optical waveguide grating.

In this case, an optical fiber is taken as an example of an optical waveguide grating, and the production of a radiative mode-coupled optical fiber grating is explained as an example.

In the drawings, reference numeral 1 denotes an optical fiber, reference numeral 2 denotes a UV beam and reference numeral 3 denotes a mask.

The optical fiber 1 comprises a core and a cladding having a refractive index lower than that of the core.

The core of the optical fiber 1 is composed of a material of which the refractive index will change when exposed to UV radiation, depending on the intensity of the UV radiation and the exposure time. Preferably, the material is silica glass doped with at least germanium oxide. The core of the optical fiber 1 can be appropriately doped with aluminum, erbium or titanium as well as germanium oxide.

The cladding of the optical fiber 1 is composed of silica-based glass. For example, pure silica glass or fluorine-doped silica glass are preferably used.

The core and cladding of the optical fiber 1 are formed by using various types of conventionally known methods so as to obtain predetermined relative refractive index differences and refractive index profiles. Usually in the case of optical fibers 1 which are used in optical fiber gratings, the core is doped with approximately 3–40% germanium oxide, and the core-cladding relative refractive index difference is set at approximately 0.3–6%.

As an optical fiber 1, it is possible to use a resin-coated optical fiber with the jacket layer removed as needed, or an optical fiber produced by means of drawing on which a jacket layer has not yet been formed.

The wavelength of the UV beam 2 should preferably be approximately 200–300 nm, and a KrF laser (wavelength 248 nm) can be suitably used as a light source. The UV beam emitted from the light source is passed through an optical system in order to adjust the spot size, then directed to irradiate the mask 3 and the optical fiber 1.

The mask 3 is composed of a material which does not transmit the UV beam 2 and is not easily damaged by the UV beam 2. For example, a metal such as stainless steel can be suitably used. The mask 3 has a plurality of slits 3a of constant widths formed at regular spacings in mutually parallel fashion. The grating pitch can be changed depending on the widths of the slits 3a and the spacing between adjacent slits 3a in the mask 3, and may be appropriately set based on the desired grating properties.

In the example, the grating pitch should be set to within a range on the order of tens to hundreds of microns in order to obtain radiative mode-coupling properties. The grating length should preferably be set to approximately 5–20 mm.

In order to produce the optical fiber grating, an optical fiber 1 is first prepared, and is preferably hydrogenated prior to irradiation by the UV beam 2.

In the case of an optical fiber wherein the germanium concentration in the core is less than a few percent, hydrogenation should preferably be performed in order to obtain sufficient core refractive index changes by means of UV beam irradiation. This hydrogenation process can be performed by holding an optical fiber 1 in a hydrogen-pressurized container regulated at 100 atm and approximately 50° C. for approximately 48 hours.

However, the hydrogenation is not essential. In the case of an optical fiber grating wherein the germanium concentration of the core is approximately 30% and the rejection may be relatively low, hydrogenation is not required.

Figure 2A:
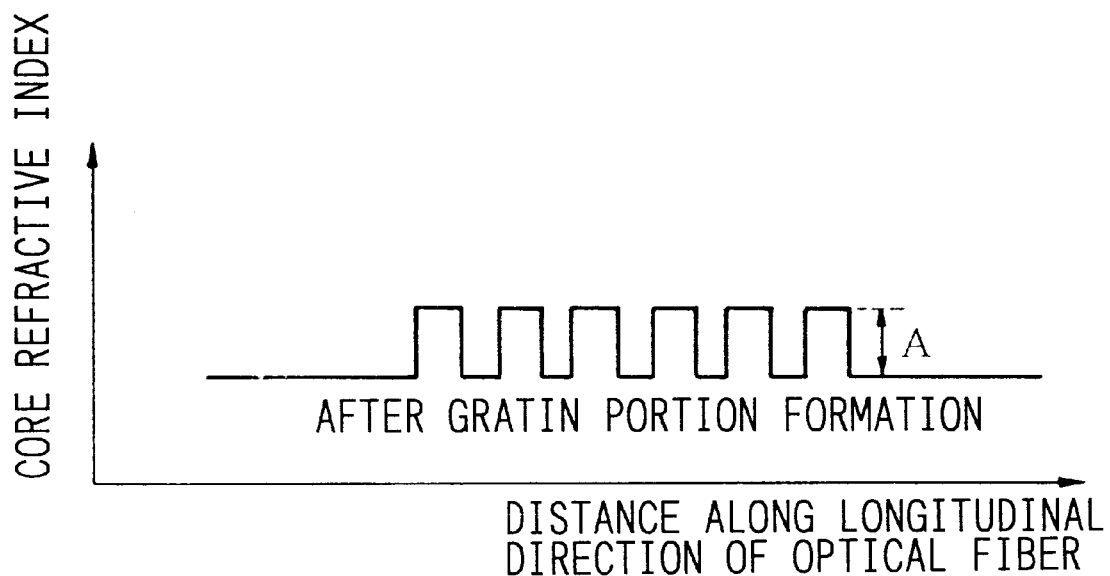
FIG. 2A shows the core refractive index profile of a grating portion according to a first embodiment of the present invention after the grating portion formation step.
Figure 2B:
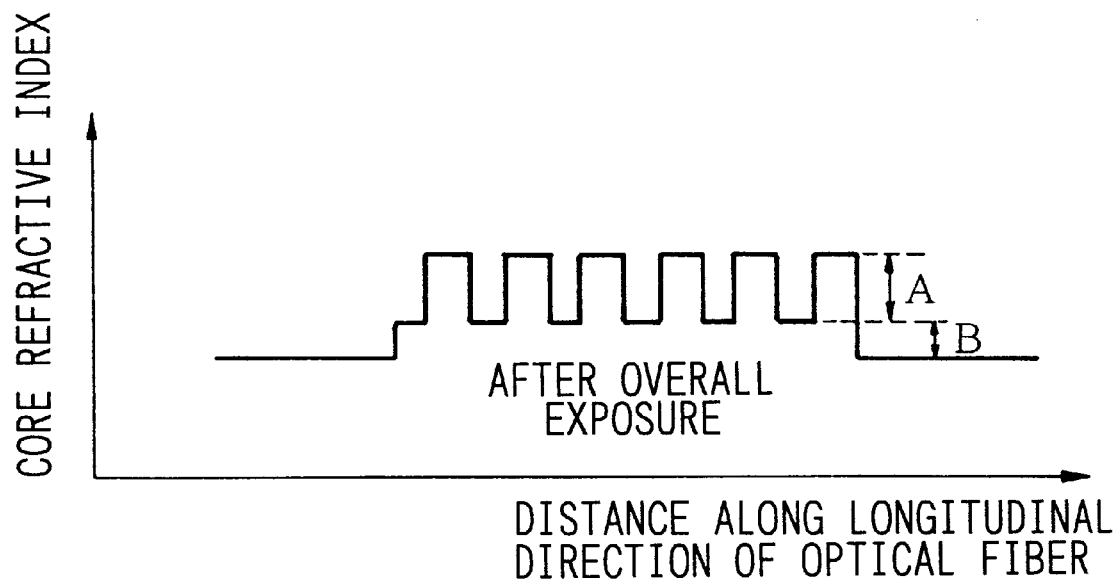
FIG. 2B shows the core refractive index profile of a grating portion according to a first embodiment of the present invention after the overall irradiation step.

Next, as shown in FIG. 1A, the optical fiber 1 is affixed directly below the mask 3. At this time, the optical fiber 1 is carefully positioned so that the longitudinal direction of the optical fiber 1 and the width direction of the slits 3a in the mask 3 are precisely parallel. The distance between the optical fiber 1 and the mask 3 should preferably be approximately 0–1 mm.

Subsequently, the mask 3 and the optical fiber 1 are irradiated by the UV beam 2 from above the mask 3. As a result, the core refractive index of the optical fiber increases at only the portions exposed to the UV beam 2, so as to form a grating portion 4 in which the core refractive index periodically changes as shown in FIG. 2A.

At this time, the grating length changes depending on the spot size of the UV beam 2 irradiating the mask 3 and the optical fiber 1, so that the spot size is set so as to result in a suitable bandwidth.

The amount of change in the core refractive index of the optical fiber 1 (denoted by "A" in FIGS. 2A and 2B) changes depending on the irradiation time and the intensity of the UV beam 2 which irradiates the mask 3 and the optical fiber 1. With the first embodiment, the central wavelength can be adjusted after the grating portion 4 has been formed as will be explained below, so that at this time the irradiation time and intensity of the UV beam 2 can be set so as to obtain the desired rejection while monitoring the transmission properties of the optical fiber 1.

The rejection changes over time until dehydrogenation as will be explained below, but since the rate of change of the rejection is sufficiently small in comparison to the rate of change of the central wavelength, and the dehydrogenation process is performed immediately in the next step, the effective change of the rejection over time may be ignored. Consequently, the above-mentioned monitor control during formation of the grating portion is effective.

After forming the grating portion 4 in this way, the hydrogen should preferably be removed from the optical fiber 1. This dehydrogenation process can be performed by leaving the optical fiber 1 for several days in temperature conditions of from room temperature to 100° C. This dehydrogenation process is effective in preventing the hydrogen added to the optical fiber prior to exposure to the UV beam from causing the refractive index to change and in preventing the rejection from changing over time after the grating portion 4 has been formed.

Figure 1B:
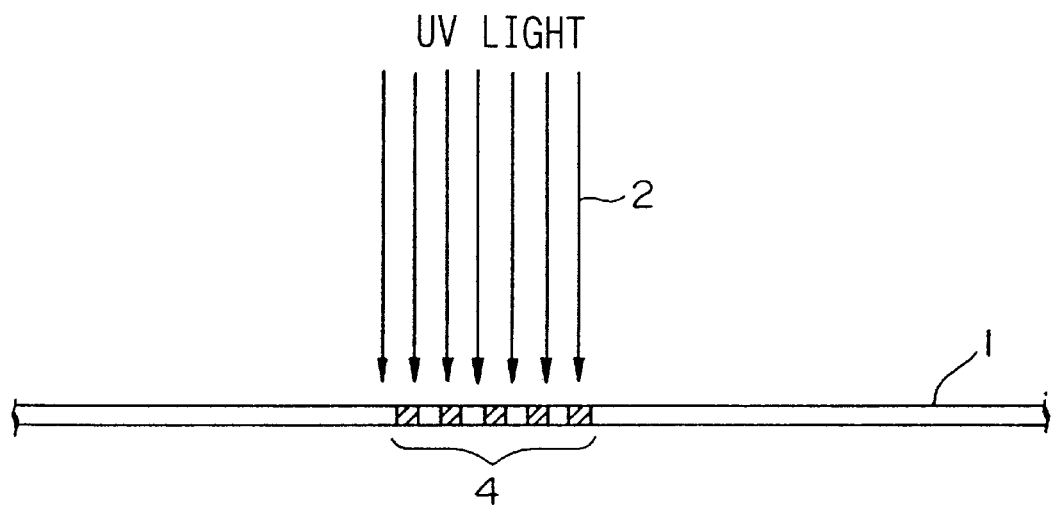
FIG. 1B is a diagram showing an overall irradiation step in a production method according to a first embodiment of the present invention.

Then, the entire grating portion 4 is directly exposed to the UV beam 2 without using the mask, as shown in FIG. 1B. As a result, the core refractive index increases over the entire portion exposed to the UV beam 2, so that the core refractive index of the grating portion 4 increases to become approximately constant over the entirety thereof as shown in FIG. 2B, and a core refractive index profile which is identical to that prior to overall irradiation is obtained for the core refractive index change A in the grating portion 4.

By causing the core refractive index to change in the entire grating portion 4, the effective refractive index of the core in the grating portion 4 can be changed so as to allow adjustment of the central wavelength properties. If the effective refractive index is increased, the central wavelength will shift to longer wavelengths.

At this time, the spot size of the UV beam 2 irradiating the optical fiber 1 can be any size as long as it allows the UV beam irradiation to be roughly uniform over the entire grating portion 4, but the spot size should preferably be equal to the spot size used during formation of the grating portion 4.

The constant core refractive index change (denoted by B in FIGS. 2A and 2B) over the entire grating portion 4 changes depending on the irradiation time and the intensity of the UV beam 2 which irradiates the entire grating portion 4. Therefore, the irradiation conditions of the UV beam 2 can be set so as to obtain a desired central wavelength while monitoring the transmission properties of the optical fiber 1.

At this time, the rejection will not change because irradiating the entirety of the grating portion 4 with the UV beam 2 will not cause any changes in the magnitude of the core refractive index change A already formed in the grating portion.

Here as mentioned above, the core must be prehydrogenated in order to allow the refractive index to change sufficiently by means of exposing a germanium-doped silica optical fiber to UV light. Therefore, while the refractive index will usually not change upon exposure to UV light after the hydrogen has been removed by dehydrogenation, the refractive index can be changed by means of exposure to UV light even after dehydrogenation in the case of germanium-doped optical fibers wherein the refractive index has once been changed by exposure to UV light. It has been confirmed through experiments that the core refractive index can be increased to such an extent that exposure to a laser beam for a few minutes can result in a change in the central wavelength of +20 nm or more.

According to the production method of this example, the rejection during formation of the grating portion 4 and the central wavelength during overall irradiation thereafter can be independently adjusted, so as to allow the grating properties to be precisely and easily controlled.

Additionally, since dehydrogenation is performed after formation of the grating portion 4, and then the entire grating portion 4 is exposed to UV light to control the central wavelength, the overall irradiation step is performed after the dehydrogenation process, so that the core refractive index does not change over time after the overall irradiation step and the transmission properties of the optical fiber grating will not change. Therefore, the transmission properties monitored during the overall irradiation step do not change over time so that the monitor control of the central wavelength based on the UV light irradiation conditions during overall irradiation are effective. Consequently, it is possible to perform monitor control of the rejection during formation of the grating portion and to perform monitor control of the central wavelength during the overall irradiation, thus allowing the rejection and the central wavelength to be independently controlled in real time in order to obtain an optical fiber grating having highly precise transmission properties. Furthermore, the rejection and central wavelength of the optical fiber grating can be prevented from changing over time after completion of the optical fiber grating, so as to obtain an optical fiber grating with exceptional reliability.

Conventionally, a plurality of masks and a plurality of UV beams must be used in order to adjust the central wavelength and rejection, but according to the production method of the present example, it is only necessary to irradiate with a UV beam while using only a single mask during formation of the grating portion 4. Additionally, it is possible to reduce production costs and shorten the production time because large quantities of the grating portions 4 can be formed using the same mask for formation of the grating portion 4.

Furthermore, while conventional methods require the expenditure of a lot of time for the work of selecting the mask and finding the optimum irradiation conditions due to the need to try several irradiation conditions on a single mask to analyze whether the desired central wavelength and rejection can be obtained in order to decide on the shape of the mask to use, the production method of the present example allows this work to be skipped. Therefore, although the production method of the present example requires a new step of overall irradiation of the grating portion 4, the overall irradiation step can be extremely short in comparison to the time required for finding the optimum conditions, so as to allow for a marked decrease in the production time.

EXAMPLE 1

A radiative mode-coupled optical fiber grating was produced by using the method shown in FIG. 1. The grating properties to be obtained in this case are a central wavelength of 1555.9 nm, a rejection of 1.2 dB, and a rejection bandwidth of 10 nm.

An optical fiber having a core composed of silica glass doped with 4 mol % of $GeO_2$ and a cladding composed of silica glass was prepared.

Next, this optical fiber was hydrogenated by holding the optical fiber in a hydrogen-pressurized container regulated at approximately 100 atm and 50° C. for 68 hours.

Subsequently, the optical fiber was placed directly under the mask as shown in FIG. 1A, and a grating portion was formed by irradiating with a UV beam having a wavelength of 248 nm from above the mask using a KrF laser as a light source. The grating pitch Λ was 383 µm and the grating length was 11 mm. The irradiation with the UV beam was performed while monitoring the transmission properties of the optical fiber. The energy density of the laser beam was 1 $mJ/mm^2$, and the central wavelength was 1553.89 nm and the rejection was 1.2 dB after 20 minutes of irradiation. The transmission spectrum obtained at this time is indicated by the solid curve in FIG. 3. The rejection bandwidth was 10 nm.

Then, this optical fiber was dehydrogenated by maintaining at a temperature of 80° C. for 48 hours.

Subsequently, as shown in FIG. 1B, the entire portion of the optical fiber in which the grating portion was formed was irradiated with a UV beam having a wavelength of 248 nm. This irradiation with a UV beam was performed while monitoring the transmission properties of the optical fiber. The energy density of the laser beam was 2 $mJ/mm^2$, and the central wavelength was 1555.9 nm after 6 minutes of irradiation.

Figure 3:
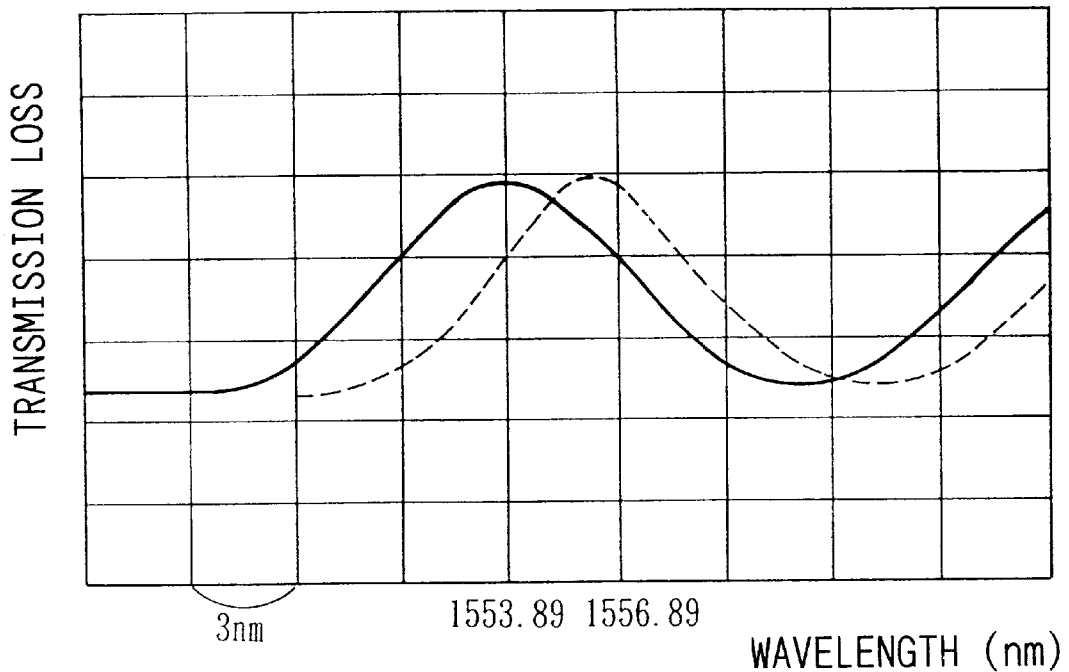
FIG. 3 is a graph showing the transmission spectrum according to a first embodiment of the present invention.
Figure 4:
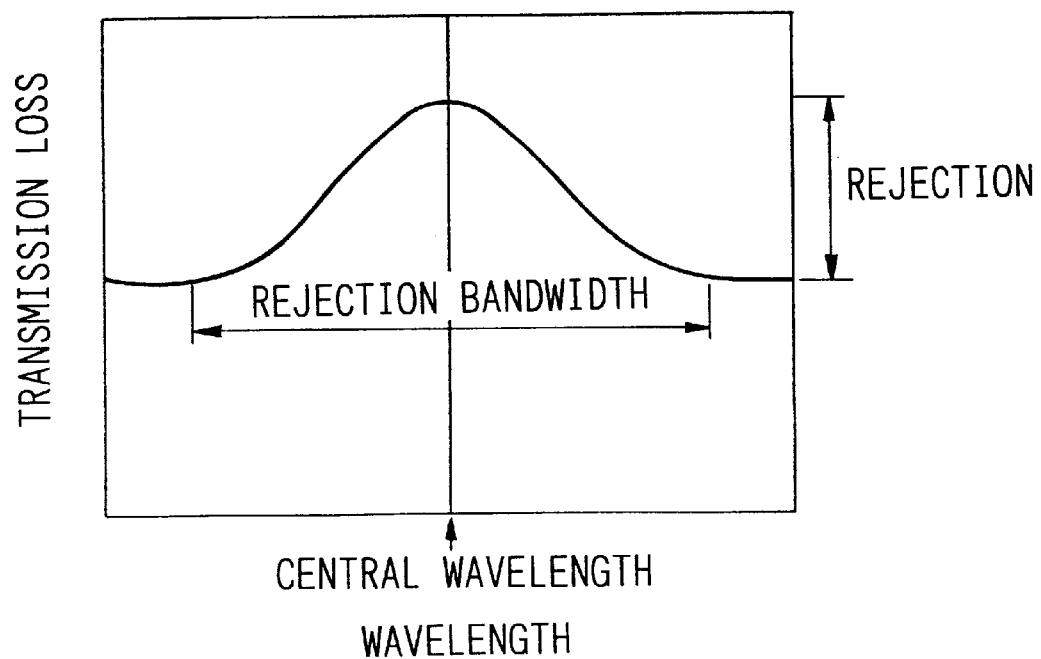
FIG. 4 is a graph showing the properties of a radiative mode-coupled optical waveguide grating.

The transmission spectrum of the optical fiber grating obtained in this way is indicated by the dashed curve in FIG. 3. As shown in this graph, the optical fiber grating has the properties of a radiative mode-coupled grating, wherein the final rejection was 1.3 dB and the rejection bandwidth was 10 nm.

While a mask was used for irradiation with a UV beam as a method for forming the grating portion in the above-described example, the process for forming the grating portion is not restricted thereto. That is, the method is arbitrary as long as the method involves forming a grating portion by UV light irradiation of an optical waveguide having a core composed of a material with a refractive index which changes due to exposure to UV light.

For example, it is possible to use a method wherein the grating portion is formed by sequentially irradiating with a UV beam with a spot size which has been condensed to a small size at regular intervals corresponding to the grating pitch along an optical waveguide.

As with the present example the grating properties can be precisely and easily controlled by adjusting the bandwidth and rejection during formation of the grating portion, then adjusting the central wavelength by exposing the entire grating portion to the UV beam after formation of the grating portion.

Additionally, while a method for producing a radiative mode-coupled optical fiber grating was explained for the above example, the method of the first embodiment can also be applied to cases of production of a reflective mode-coupled grating as well as to radiative mode-coupled gratings.

However, since the magnitude of the change in the central wavelength with respect to the core refractive index change is large in radiative mode-coupled gratings, the effect of resolving the difficulty in controlling the properties during formation of the grating by means of the production method of the first embodiment is greater for radiative mode-coupled gratings than for reflective mode-coupled gratings.

<Second Embodiment>

Figure 5:
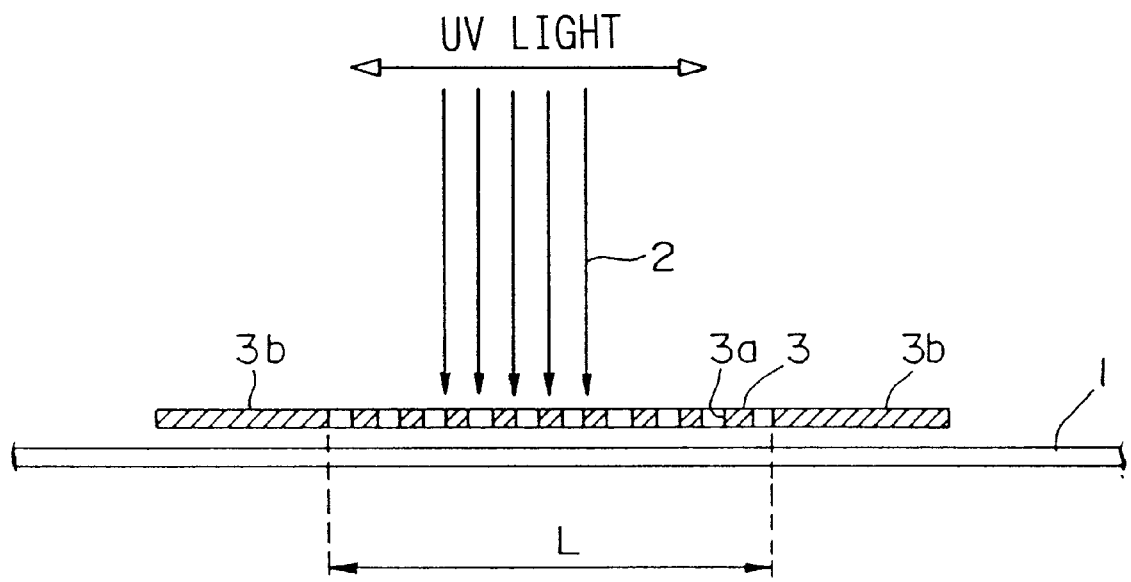
FIG. 5 is a diagram for explaining an example of a method for producing an optical waveguide grating according to a second embodiment of the present invention.
Figure 6:
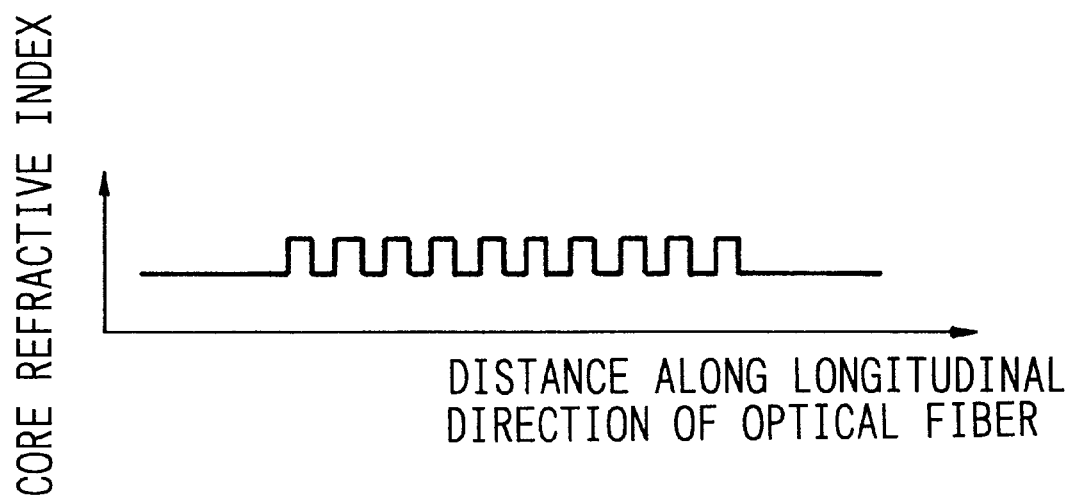
FIG. 6 is a graph showing an example of a core refractive index profile in an optical waveguide grating obtained by a production method according to the second embodiment of the present invention.
Figure 7:
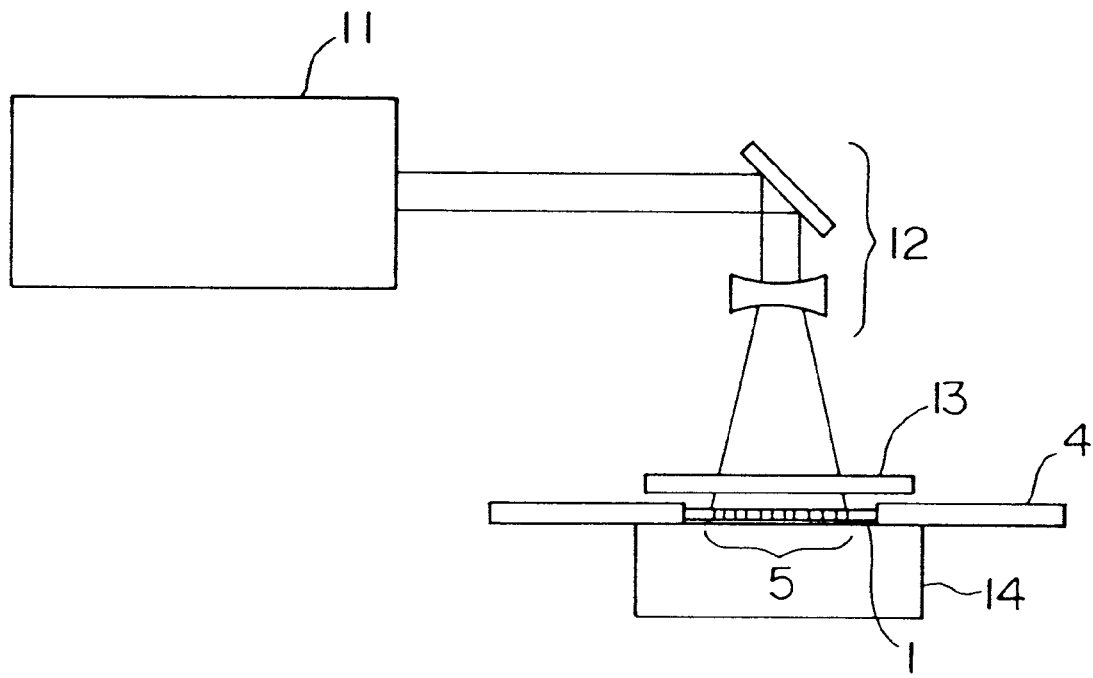
FIG. 7 is a schematic diagram showing an example of a conventional optical fiber grating production apparatus.
Figure 8:
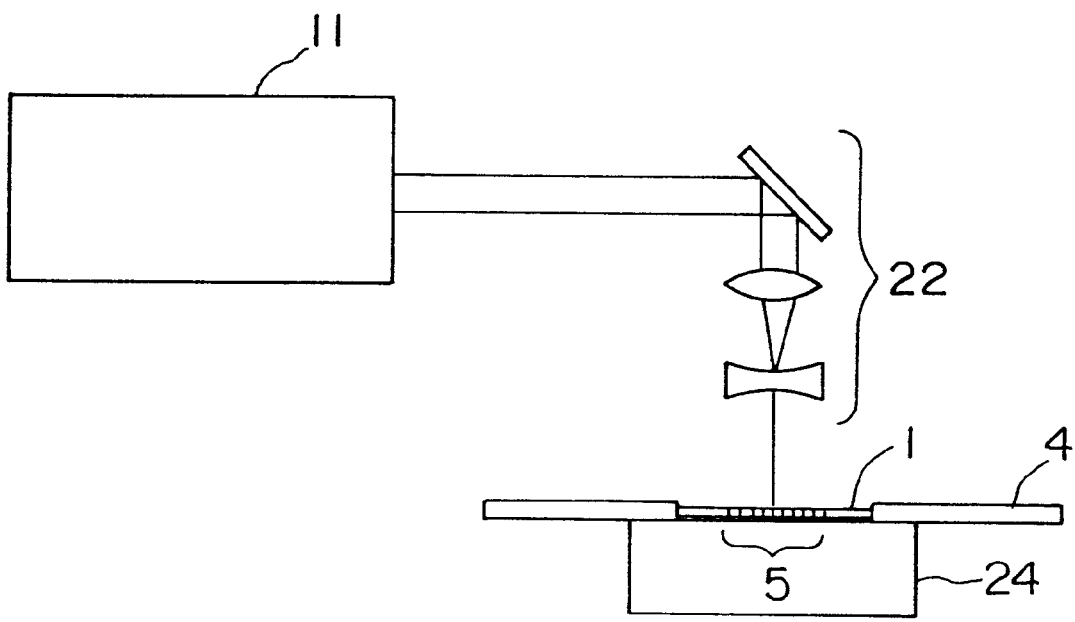
FIG. 8 is a schematic diagram showing another example of a conventional optical fiber grating production apparatus.

FIG. 5 is a diagram for explaining an example of a method for producing an optical waveguide grating according to a second embodiment of the present invention, and FIG. 6 is a graph showing an example of a core refractive index profile of a grating portion formed according to the method of the second embodiment. In this case, an example wherein a radiative mode-coupled optical fiber grating is produced by using an optical fiber as an optical waveguide is explained.

In the drawing, reference numeral 1 denotes an optical fiber, reference numeral 2 denotes a UV beam and reference numeral 3 denotes a mask.

The optical fiber 1 used for the second embodiment is identical to that used for the first embodiment shown in FIG. 1.

The mask 3 used in the second embodiment is composed of a material which does not transmit the UV beam 2 and is not easily damaged by the UV beam 2. For example, a metal such as stainless steel should preferably be used. The mask 3 has a plurality of slits 3a of constant widths formed such as to be mutually parallel at regular spacings. The grating pitch changes depending on the widths of the slits 3a and the spacing between adjacent slits 3a in the mask 3, and is appropriately set depending on the desired grating properties. Additionally, the grating length changes depending on the length L in the width direction of the slits 3a of the portion of the mask 3 having the slits 3a, so this is appropriately set in accordance with the desired grating properties.

In order to obtain mode-coupling properties in the second embodiment, the grating pitch should preferably be set within a range on the order to tens to hundreds of microns. The grating length should preferably be set to approximately 5–20 mm.

In this example, light shielding portions 3b which have no slits and completely shield the UV light should preferably be provided at both end portions of the portion having slits 3a in the width direction of the slits 3a. If the core refractive index change due to irradiation with the UV beam 2 is made uniform along the longitudinal direction of the optical fiber 1, then the light shielding portions 3b which are larger than the spot size of the UV beam 2 should be provided at both ends of the mask 3 in the longitudinal direction of the optical fiber 1, but the structure may be such as to not be provided with such light shielding portions 3b.

The wavelength of the UV beam 2 used in the second embodiment should preferably be approximately 200–300 nm. For example, a KrF laser (248 nm) is suitable for use as a light source. In the second embodiment, the spatial distribution of the optical intensity (UV intensity distribution of the spot) of the UV beam 2 need not be uniform, and may be nonuniform. Therefore, there is no need to use an optical system in order to enlarge a portion of the UV beam emitted from the light source, and the spot size should preferably be adjusted to a predetermined size by means of enlarging or condensing substantially all of the beam emitted from the light source for irradiation. Here, irradiation with "substantially all" of the UV beam emitted from the light source refers to irradiation of the mask 3 with the emitted UV beam without significant attenuation with the exception of any attenuation of the beam which is unavoidable due to the structure of the apparatus.

Additionally, if the spot size of the UV beam irradiating the mask 3 and the optical fiber 1 is too large, the energy density is reduced and the irradiation time must be extended, while if too small, the UV intensity distribution is concentrated so as to increase the influence of displacement in the spot position. Hence, the spot size should preferable be set to approximately 2–20×20 mm, more preferably 2×20 mm.

In order to produce an optical fiber grating according to the second embodiment, an optical fiber 1 should first be prepared, and should preferably be hydrogenated prior to exposure to the UV beam 2.

This hydrogenation process is performed in order to obtain sufficient refractive index changes in the germanium-doped silica glass (core) due to UV irradiation, and can be achieved by holding the optical fiber 1 in a hydrogen-pressurized container regulated at 100 atm and 50° C. for approximately 60 hours.

Next, the optical fiber 1 is affixed directly under the mask 3. At this time, the optical fiber 1 is carefully positioned so as to make the longitudinal direction of the optical fiber 1 and the width direction of the slits 3a precisely parallel. Additionally, the distance between the optical fiber 1 and the mask 3 should preferably be set to approximately 0–1 mm.

Subsequently, the mask 3 and the optical fiber 1 are irradiated with a UV beam 2 from above the mask 3, and the position of irradiation of the UV beam 2 is shifted along the longitudinal direction of the optical fiber 1 using a suitable drive device. In order to shift the irradiation position in this way, it is sufficient to move the UV beam 2 relative to the mask 3 and the optical fiber 1. Hence, it is possible to shift the UV beam 2 along the longitudinal direction of the optical fiber 1 while holding the mask 3 and the optical fiber 1 stationary, or to move the mask 3 and the optical fiber 1 along the longitudinal direction of the optical fiber 1 while holding the UV beam 3 stationary, or to move both simultaneously. In any case, the optical fiber 1 and the mask 3 must be prevented from moving relative to each other during irradiation with the UV beam 2.

In this case, the amount of change of the core refractive index in the optical fiber 1 changes depending on the irradiation time and the intensity of the UV beam, so that the amount of change of the core refractive index and the profile of the core refractive index change (grating shape) can be controlled by appropriately adjusting the shifting speed of the irradiation position.

For example, even if the intensity of the UV beam 2 is spatially nonuniform, it is possible to obtain an optical fiber grating with a uniform core refractive index change over all parts of the grating portion as shown in FIG. 6 by moving the irradiation position along the core from one end of the mask 3 to the other end of the mask 3 at a constant speed.

Additionally, the shifting speed of the irradiation position of the UV beam 2 can be arbitrarily changed, and it is possible to obtain arbitrary shapes for the core refractive index change profile (grating shape) by appropriately changing the shifting speed along the longitudinal direction of the optical fiber 1.

According to the production method of the second embodiment, it is possible to obtain a grating shape wherein the refractive index is uniform along the longitudinal direction of the optical fiber even if the UV intensity distribution in the spot of the UV beam 2 is nonuniform, or to control the grating shape to arbitrary shapes by controlling the shifting speed of the irradiation position.

Since the method is for forming a grating portion by irradiating the optical fiber 1 with a UV beam through a mask 3, it is easy to make design changes and the production efficiency is good.

Furthermore, substantially all of the UV beam emitted from the light source can be used for irradiation of the mask 3 and the optical fiber 1, so that the energy efficiency is extremely high and the time required to produce the grating can be shortened.

The radiative mode-coupled optical fiber gratings obtained in this way can be used in fields such as optical communications, and are especially suited to use in optical communication systems which use erbium-doped fiber amplifiers, for suppressing spontaneously emitted light from erbium-doped optical fibers or for reducing the wavelength dependence of the gain in erbium-doped optical fiber amplifiers.

While a radiative mode-coupled optical waveguide grating was made by using an optical fiber as an optical waveguide in the example explained above, the same production method can also be used for cases wherein a planar optical waveguide is used as an optical waveguide.

<Third Embodiment>

Figure 9A:
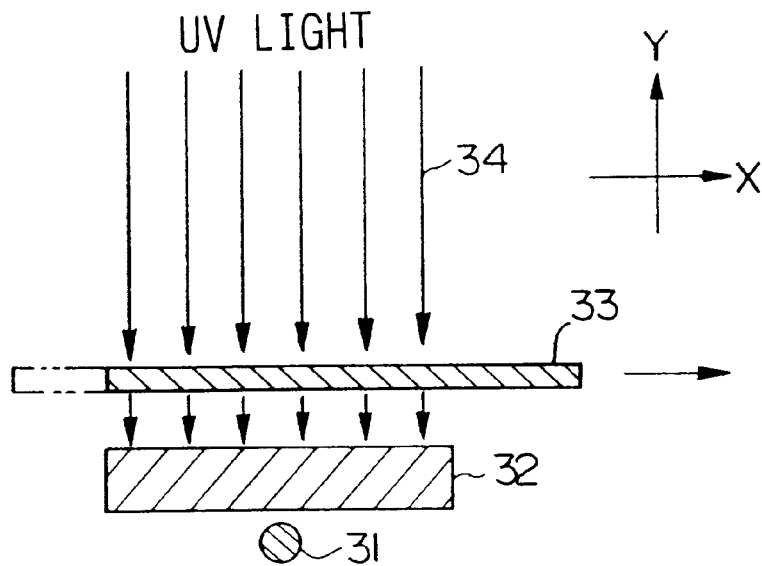
FIG. 9A is a section view showing an example of a grating portion formation step according to a third embodiment of the present invention.
Figure 9B:
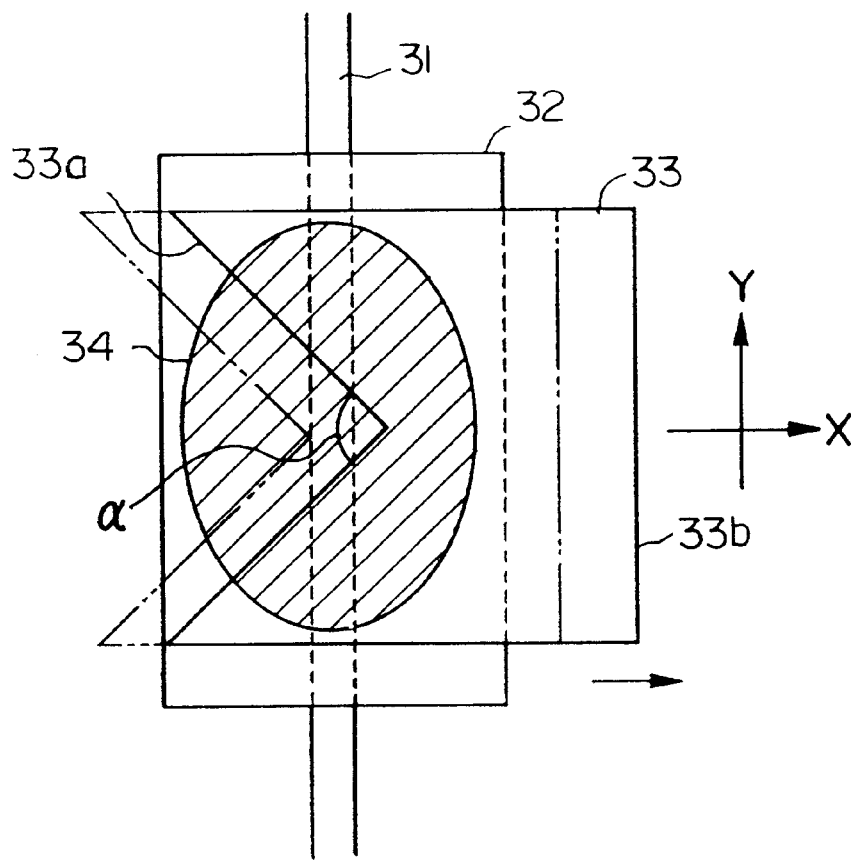
FIG. 9B is a top view showing an example of a grating portion formation step according to a third embodiment of the present invention.

FIGS. 9A and 9B show a process for forming a grating portion in an example of a method for producing optical waveguide gratings according to a third embodiment of the present invention. FIG. 9A is a section view, and FIG. 9B is a top view. Here, an example wherein a reflective mode-coupled optical fiber grating is produced using an optical fiber as an optical waveguide will be explained.

In the drawings, reference numeral 31 denotes an optical fiber, reference numeral 32 denotes a phase mask, reference numeral 33 denotes a first shielding plate, and reference numeral 34 denotes a UV beam.

The optical fiber 31 is identical to that used in the first embodiment shown in FIG. 1.

The phase mask 32 has a plurality of slits of uniform widths formed so as to be mutually parallel at regular spacings on the surface of a silica glass plate. The grating pitch of the grating portion changes depending on the widths of the slits and the spacing between adjacent slits in the phase mask 32, so that these should be appropriately set in accordance with the desired grating properties. When the period of the slits in the phase mask 32 is defined to be $\Lambda_m$, then the grating pitch $\Lambda$ will follow the relation $\Lambda=\Lambda_m/2$.

The phase mask 32 is positioned above the optical fiber 31 in such a manner as to make the longitudinal direction (Y direction) of the optical fiber 31 precisely parallel to the width direction of the slits in the phase mask 32.

The first shielding plate 33 used in the present example is a flat plate which has a V-shaped indented portion 33a formed on one end. The first shielding plate 33 is composed of a material which does not transmit the UV beam 34 and is not easily damaged by the UV beam 34. For example, a metal such as stainless steel can be suitably used.

This first shielding plate 33 is positioned above the phase mask 32 such that the depth direction (X direction) of the indented portion 33a and the longitudinal direction (Y direction) of the optical fiber 31 are perpendicular and the first shielding plate 33 is controlled so as to be capable of shifting in the depth direction (X direction) of the indented portion 33a.

The size of the first shielding plate 33 is set such that the length of the first shielding plate 33 in the longitudinal direction (Y direction) of the optical fiber 31 is at least as long as the desired grating length. In this example, the interior angle $\alpha$ of the indented portion 33a is preferable 90 degrees, but this angle $\alpha$ can be changed as appropriate.

The wavelength of the UV beam 34 should preferably be approximately 200–300 nm, and a KrF laser (248 nm) should preferably be used as the light source. After adjusting the spot size of the UV beam emitted from the light source using a suitable optical system, it is irradiated perpendicularly onto the top surface of the phase mask 32.

The spot size of the UV beam 34 determines the area over which an interference pattern is formed, i.e. the grating length, and should be appropriately set in accordance with the desired grating properties.

In this example, the grating pitch should preferably be set to within a range of approximately 340–720 nm in order to obtain reflective mode-coupling properties. Additionally, the grating length should preferably be set to approximately 5–20 mm.

In order to make the optical fiber grating, an optical fiber 31 is first prepared and should preferably be hydrogenated prior to irradiation with the UV beam 34.

In an optical fiber wherein the germanium concentration in the core is no more than a few percent, a hydrogenation should be performed beforehand in order to obtain sufficient core refractive index changes due to UV beam irradiation. This hydrogenation process is performed by leaving the optical fiber 31 in a hydrogen-pressurized container regulated at approximately 100 atm and 50° C. for approximately 60 hours.

However, this hydrogenation process is not essential, and may be skipped if the germanium concentration in the core is approximately 30% and the rejection of the optical fiber grating may be relatively low.

Next, the optical fiber 31 is positioned directly under the phase mask 32 as shown in FIG. 9. At this time, the distance between the optical fiber 31 and the phase mask 32 should preferably be set to approximately 0–15 mm.

Additionally, the first shielding plate 33 is positioned above the phase mask 32. At this time, the optical fiber 31 is disposed so as to be positioned towards the straight end 33b of the first shielding plate 33 opposite to the indented portion 33a as indicated by the double-dotted line in FIG. 9B, so that the first shielding plate 33 completely shields the optical fiber 31 from irradiation by the UV beam 34. The distance between the phase mask 32 and the first shielding plate 33 should preferably be set to approximately 0–1 m.

Next, while irradiating with the UV beam 34 from above the first shielding plate 33, the first shielding plate 33 is shifted along the depth direction (X direction) of the indented portion 33a so that the straight end 33b of the first shielding plate 33 is moved away from the optical fiber 31. At this time, the intensity of the UV beam 34 may be constant. The UV beam 34, the optical fiber 31 and the phase mask 32 are held stationary.

By shifting the first shielding plate 33 while irradiating with the UV beam 34, an area positioned below the indented portion 33a is exposed on the optical fiber 31, and this area is irradiated by the UV beam 34 through the phase mask 32 so as to form the grating portion.

Additionally, shifting the first shielding plate 33 causes the area of the optical fiber 31 irradiated by the UV beam 34 to gradually increase along both ends of the optical fiber 31, so that the UV beam irradiation time of the optical fiber 31 changes along the longitudinal direction of the optical fiber 31. The change in the core refractive index at the grating portion changes depending on the UV beam irradiation time. Therefore, the grating portion formed in this manner has a core refractive index change which changes along the longitudinal direction of the optical fiber 31, thus achieving apodization.

Figure 10A:
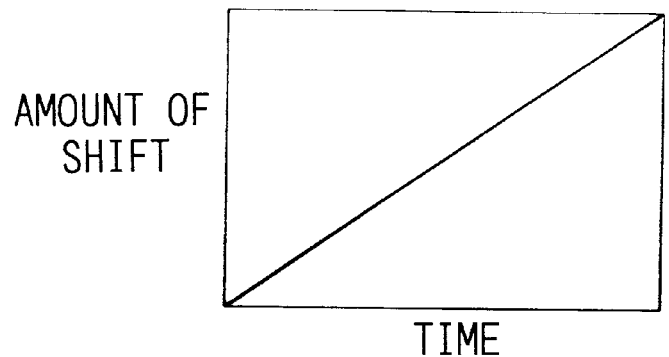
FIG. 10A is a graph showing the shifting conditions of the shielding plate during the grating portion formation step of FIGS. 9A and 9B.
Figure 10B:
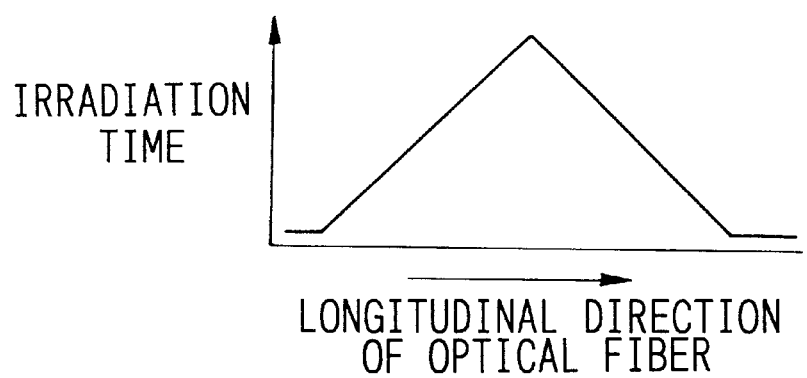
FIG. 10B is a graph showing the UV beam irradiation time distribution during the grating portion formation step in the example of FIG. 10A.

FIG. 10A is a graph showing an example of the shifting conditions of the first shielding plate 33. The horizontal axis represents the elapsed time and the vertical axis represents the amount of shift from the initial position. When the first shielding plate 33 is moved at a constant speed as shown in this graph, the change in the UV beam irradiation time along the longitudinal direction of the optical fiber 31 forms a triangular distribution as shown in FIG. 10B. That is, the center of the grating portion in the longitudinal direction of the optical fiber 31 is the longest, and the UV beam irradiation time decreases linearly towards both ends of the grating portion. Consequently, at the grating portion, the core refractive index periodically increases as indicated by the solid line in FIG. 10C, while the amount of change (amount of increase) changes along the longitudinal direction of the optical fiber 31 as indicated by the dashed line in FIG. 10C. That is, the core refractive index change distribution along the longitudinal direction of the optical fiber 31 is largest at the center of the grating portion and linearly decreases towards both ends of the grating portion.

After forming the grating portion while performing apodization in this manner, the resulting optical fiber grating should preferably be analyzed for its reflective properties. If it is confirmed that good properties have been obtained, then the entire grating portion should be irradiated with the UV beam 34 while performing apodization without using a phase mask 32 in order to make the effective refractive index uniform along the longitudinal direction of the optical fiber.

Figure 11:
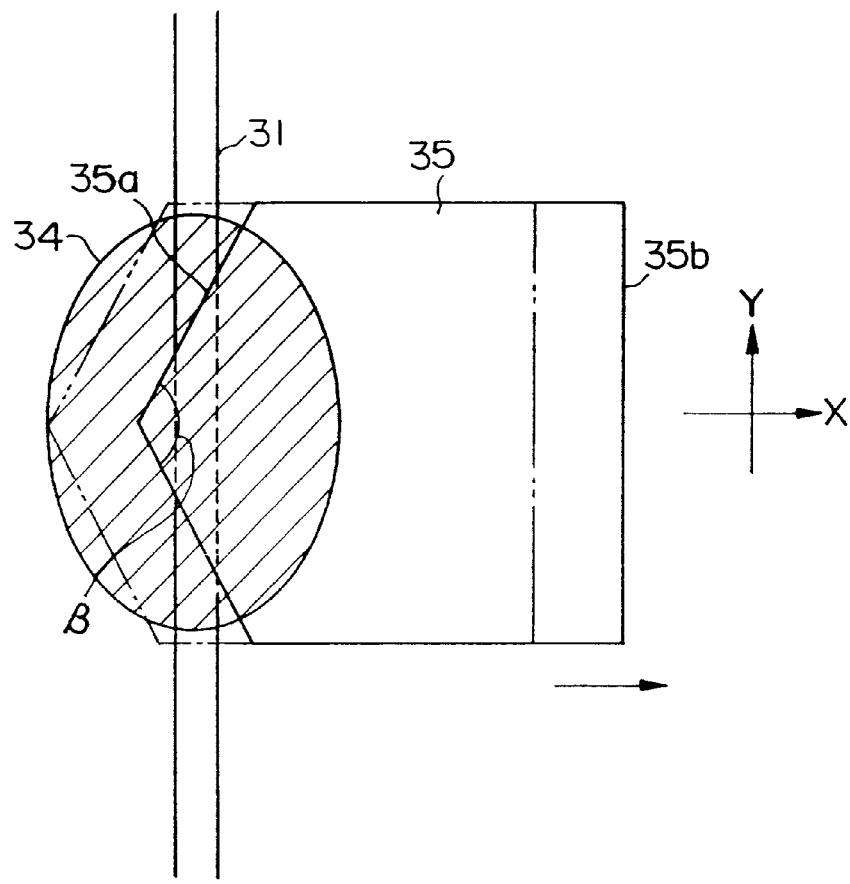
FIG. 11 is a top view showing an example of an overall irradiation step according to a third embodiment of the present invention.

FIG. 11 is a top view showing an example of this overall exposure process. In the drawing, reference numeral 35 denotes a second shielding plate which has a shape which complements that of the first shielding plate 33. In this example, the second shielding plate 35 is a flat plate which has a V-shaped projecting portion 35a on one end. This second shielding plate 35 may be composed of the same material as the first shielding plate 33.

This second shielding plate 35 is positioned above the optical fiber 31 such that the height direction (X direction) of the projecting portion 35a is perpendicular to the longitudinal direction (Y direction) of the optical fiber 31, and the second shielding plate 35 is controlled so as to be capable of shifting along the height direction (X direction) of the projecting portion 35a.

The size of this second shielding plate 35 should preferably be such that the length of the second shielding plate 35 in the longitudinal direction (Y direction) of the optical fiber 31 is equal to that of the first shielding plate 33. the apex angle β of the projecting portion 35a should preferably be 135 degrees in the present example, but the angle β may be changed as appropriate.

In this overall exposure process, the second shielding plate 35 is first positioned above the optical fiber 31. At this time, the optical fiber 31 is positioned further to the side of the straight end 35b than the projecting portion 35a of the second shielding plate 35 as indicated by the double-dotted line in FIG. 11, so that the second shielding plate 35 completely shields the optical fiber 31 from exposure to the UV beam 34. The distance between the optical fiber 31 and the second shielding plate 35 should preferably be set to approximately 0–1 m.

Next, while irradiating the second shielding plate 35 with the uv beam 34 from above, the second shielding plate 35 is shifted along the height direction (X direction) of the projecting portion 35a so as to move the straight end 35b of the second shielding plate 35 away from the optical fiber 31. At this time, the intensity of the UV beam 34 may be constant, and the spot size of the UV beam 5 is set such as to be capable of simultaneously irradiating at least the entire grating portion. The UV beam 34 and the optical fiber 31 are held stationary.

By shifting the second shielding plate 35 in this manner, an area positioned under the projecting portion 35a occurs on the optical fiber 31, and only the areas to both sides of the grating portion with respect to the area under the projecting portion 35a are irradiated with the UV beam 34. Additionally, the area of the optical fiber 31 which is exposed to the UV beam 34 is gradually enlarged towards the center of the grating portion in accordance with the shifting of the second shielding plate 35.

By shifting the second shielding plate 35 above the optical fiber 31 while irradiating with a UV beam 34 in this manner, the UV beam irradiation time with respect to the optical fiber 31 can be made to change along the longitudinal direction of the optical fiber 31. The core refractive index of the optical fiber 31 at the portions irradiated with the UV beam 34 increase depending on the irradiation time.

Figure 12:
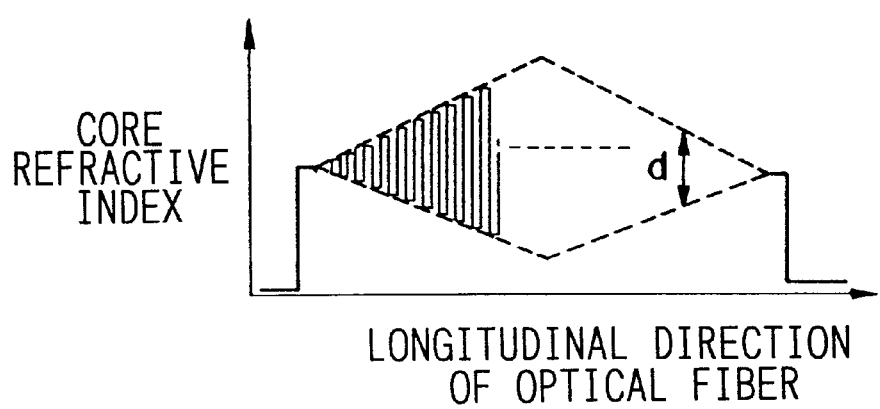
FIG. 12 is a graph showing the core refractive index distribution during the overall irradiation step of FIG. 11.

Therefore, if the second shielding plate 35 is shifted at a constant speed in the present example, the core refractive index change due to overall exposure is largest at both ends of the grating portion, and gradually decreases linearly towards the center of the grating portion. As a result, the core refractive index in the grating portion changes from the distribution shown in FIG. 10C to the distribution shown in FIG. 12. At this time, the magnitude of the periodic changes in the core refractive index (shown in FIG. 10C and indicated by d in FIG. 12) at the grating portion previously formed using the phase mask 32 is not different before and after overall exposure.

By performing an overall exposure with a UV beam irradiation time distribution which complements the UV beam irradiation time distribution along the longitudinal direction of the optical fiber during formation of the grating portion, the effective refractive index along the longitudinal direction of the optical fiber becomes constant, so as to result in improved grating properties.

Figure 13:
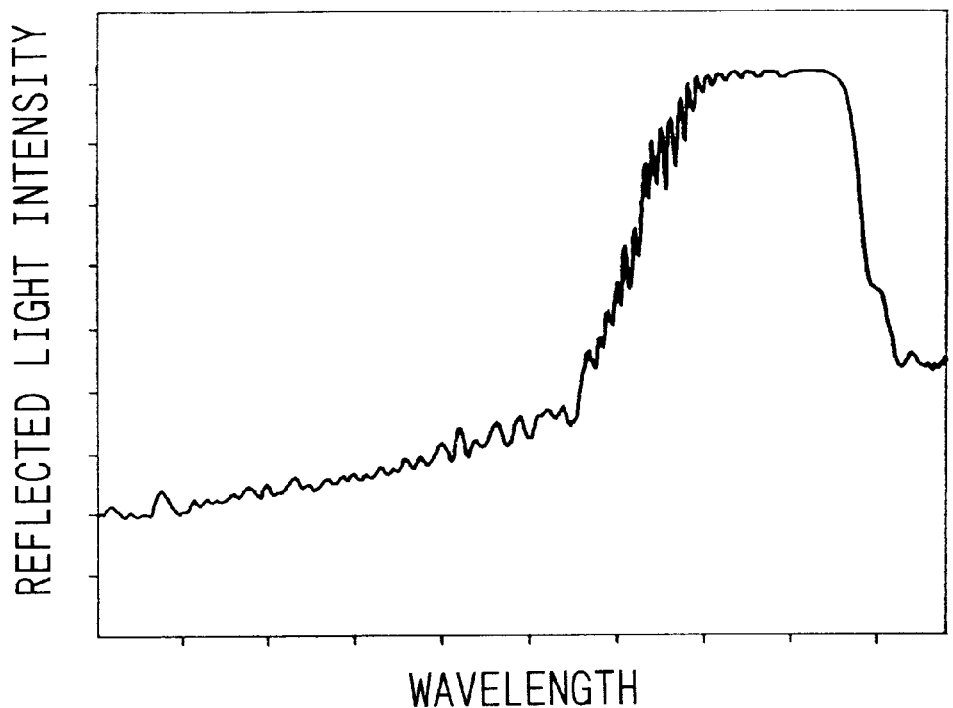
FIG. 13 is a graph showing an example of the occurrence of ripples within the reflection bands of reflective mode-coupled optical waveguide gratings.

That is, although apodization is performed while forming the grating portion in order to suppress reflection outside of the central wavelength of the grating (anomalous ripples) as mentioned above, if this causes the effective refractive index in the grating portion to become nonuniform, then small ripples can form on the short wavelength side of the reflection band in the reflection spectrum, i.e. ripples can form inside the band, as shown in FIG. 13.

Figure 10C:
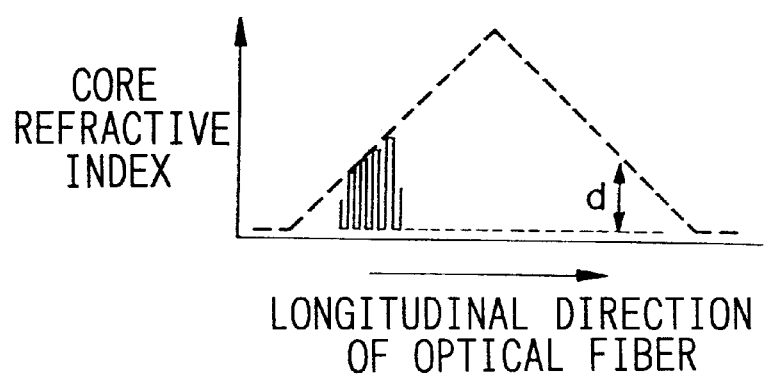
FIG. 10C is a graph showing the core refractive index distribution obtained by the grating portion formation step in the example of FIG. 10A.
Figure 14:
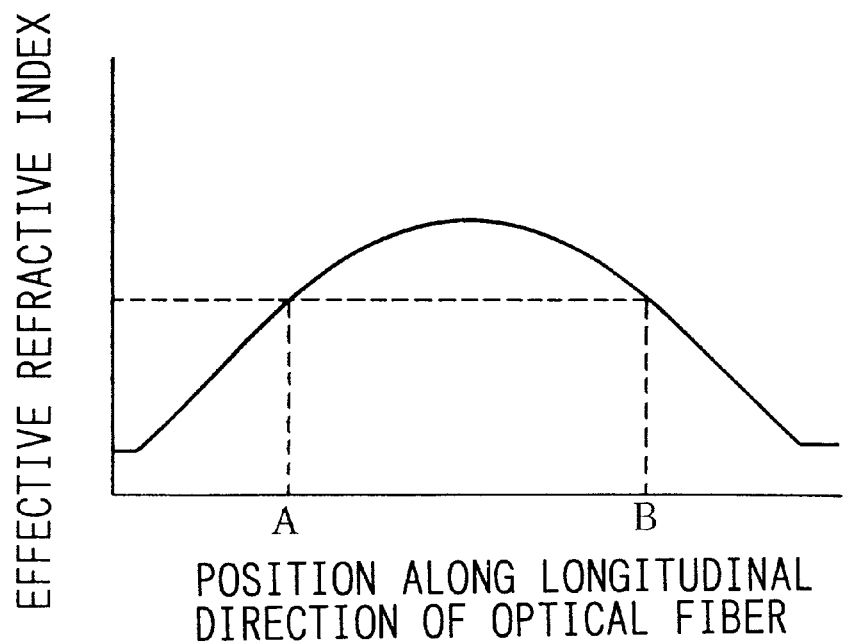
FIG. 14 is a graph for explaining the causes of the ripples in the rejection bands.

The cause of this effect is that the effective refractive index in the grating portion will have a mound-shaped distribution as shown in FIG. 14 when the grating portion is formed while performing apodization such that the core refractive index change distribution forms a triangular distribution as shown in FIG. 10C during the grating portion formation process. In this case, the effective refractive index becomes equal at two different points A and B in the longitudinal direction of the optical fiber, and this effectively forms a resonator between points A and B.

Hence, the effective refractive index should be made constant along the longitudinal direction of the optical fiber in order to prevent the occurrence of ripples inside the band.

That is, by performing the overall exposure with apodization which complements the apodization of the grating formation procedure, the core refractive index along the entire grating portion is remodified to complement the change in the effective refractive index along the longitudinal direction made during the grating formation procedure, thereby making the effective refractive index of the optical fiber 31 constant in the longitudinal direction and preventing the occurrence of band ripples caused by nonuniformities in the effective refractive index.

The optical fiber grating obtained after the overall exposure process is finally analyzed for reflective properties, and once it has been confirmed to have the desired properties, a reflective mode-coupled optical fiber grating is obtained as a product.

If the optical fiber has been hydrogenated prior to UV beam irradiation, then the hydrogen in the optical fiber 13 should preferably be removed. This dehydrogenation process can be performed by leaving the optical fiber 31 for several days in temperature conditions of from room temperature to 100° C. This dehydrogenation process is effective in preventing refractive index changes caused by the hydrogen added to the optical fiber 31 prior to UV beam irradiation, thus preventing the properties of the grating portion from changing over time.

According to the production method of this example, apodization can be easily performed by means of a simple process of using a first shielding plate 33 during formation of the grating portion and moving this first shielding plate 33 while irradiating with a UV beam 34. As a result, anomalous ripples can be suppressed so as to obtain a reflective optical fiber grating with exceptional properties.

Additionally, this type of process wherein apodization is performed by using a shielding plate can be suitably used in the overall exposure process by changing the shape of the shielding plate, thereby easily making the effective refractive index constant. Consequently, the properties of the reflective optical fiber grating can be improved by preventing the occurrence of anomalous ripples which are caused by nonuniformities in the effective refractive index.

Furthermore, it is sufficient to move only the first shielding plate 33 or the second shielding plate 35 during irradiation with the UV beam 34, and the UV beam 34, the optical fiber 31 and the phase mask 32 can all be held stationary. As a result, it is possible to resolve problems such as complexity of the production apparatus or process, cost increases, reduced precision and difficulties in the work procedures which can arise due to the need to move the UV beam 34, the optical fiber 31 or the phase mask 32 during irradiation by the UV beam 34.

Additionally, in the above example, the core refractive index change distribution in the grating portion can be controlled to a desired distribution shape by changing the shifting conditions (change in shifting speed of the first shielding plate 33). FIGS. 15A–15C and 16A–16C show other examples of shifting conditions of the first shielding plate 33 which can be used during formation of the grating portion in the above example, and the irradiation time distribution and core refractive index change distribution corresponding to these shifting conditions.

Figure 15A:
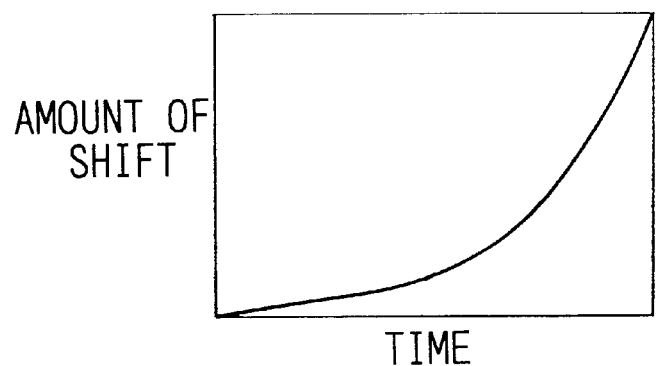
FIG. 15A is a graph showing another example of the shifting conditions of the shielding plate during the grating portion formation step of FIGS. 9A and 9B.
Figure 15B:
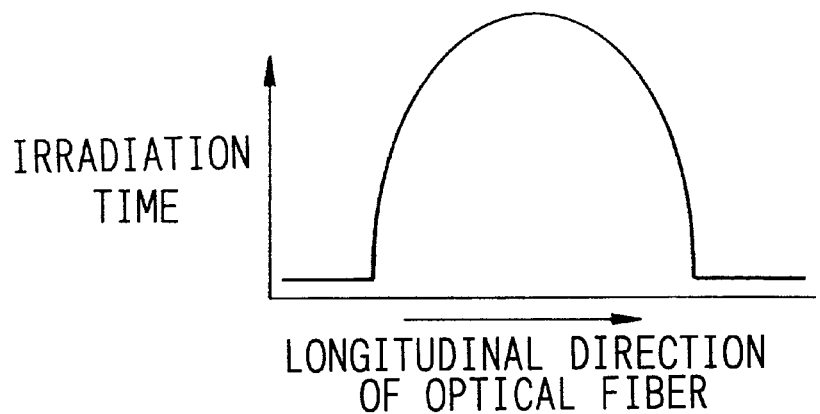
FIG. 15B is a graph showing the UV beam irradiation time distribution during the grating portion formation step in the example of FIG. 15A.
Figure 15C:
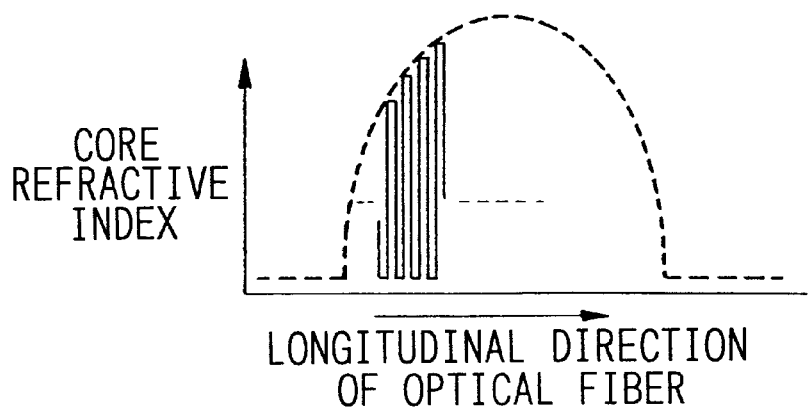
FIG. 15C is a graph showing the core refractive index distribution obtained by the grating portion formation step in the example of FIG. 15A.

For example, if the first shielding plate 33 is shifted while gradually increasing the shifting speed as shown in FIG. 15A, the UV beam irradiation time distribution along the longitudinal direction of the optical fiber 31 forms a parabolic curve as shown in FIG. 15B. The core refractive index change in the grating portion also changes to form a parabolic curve along the longitudinal direction of the optical fiber 31 as indicated by the dashed line in FIG. 15C.

Figure 16A:
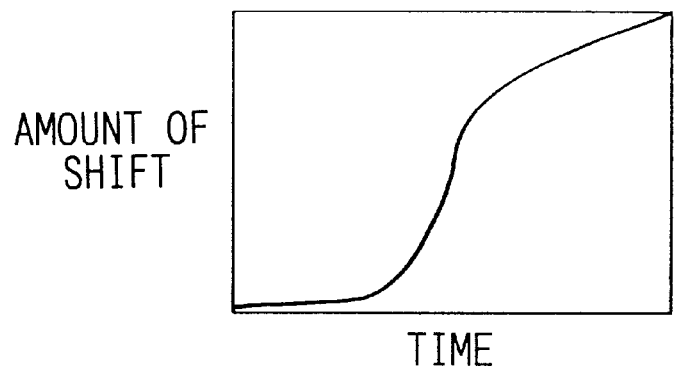
FIG. 16A is a graph showing another example of the shifting conditions of the shielding plate during the grating portion formation step of FIGS. 9A and 9B.
Figure 16B:
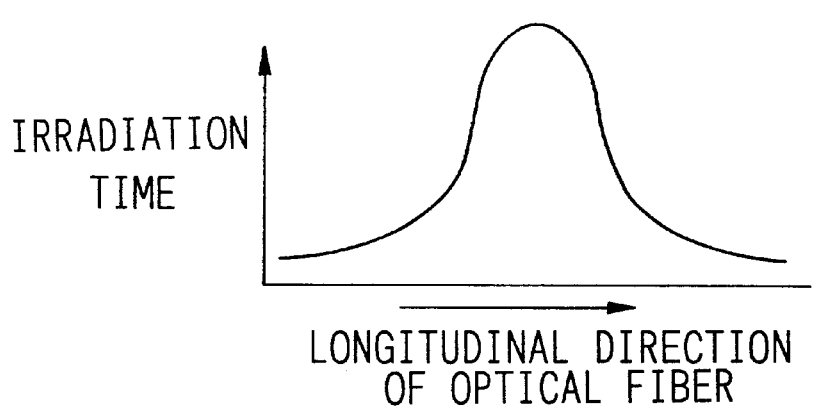
FIG. 16B is a graph showing the UV beam irradiation time distribution during the grating portion formation step in the example of FIG. 16A.
Figure 16C:
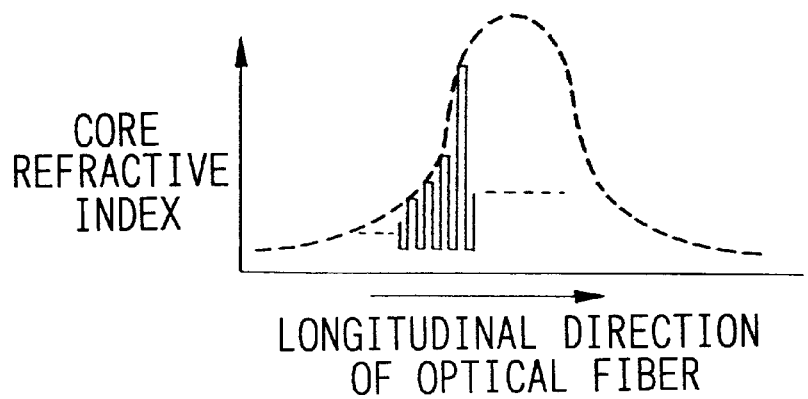
FIG. 16C is a graph showing the core refractive index distribution obtained by the grating portion formation step in the example of FIG. 16A.
Figure 17A:
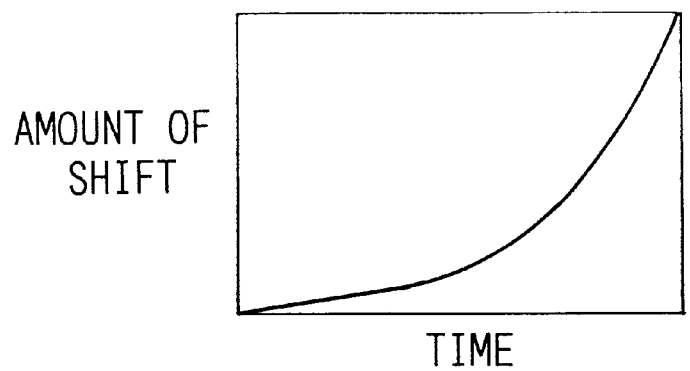
FIG. 17A is a graph showing the shifting conditions of the shielding plate during the overall irradiation step of FIG. 11.
Figure 17B:
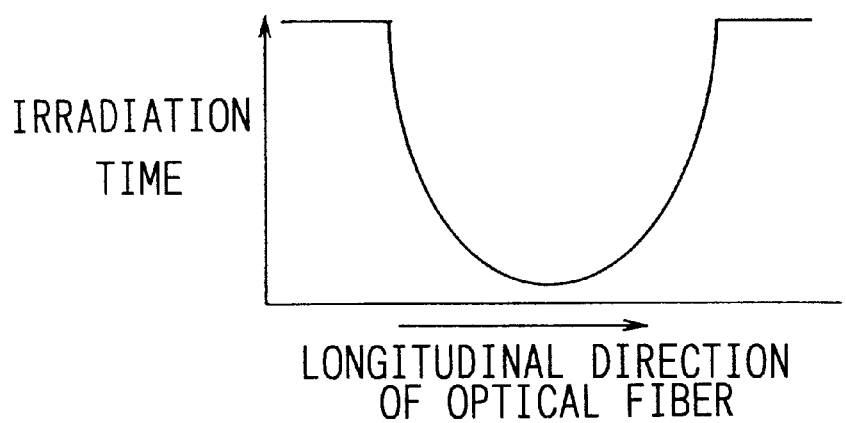
FIG. 17B is a graph showing the UV beam irradiation time distribution during the overall irradiation step in the example of FIG. 17A.
Figure 17C:
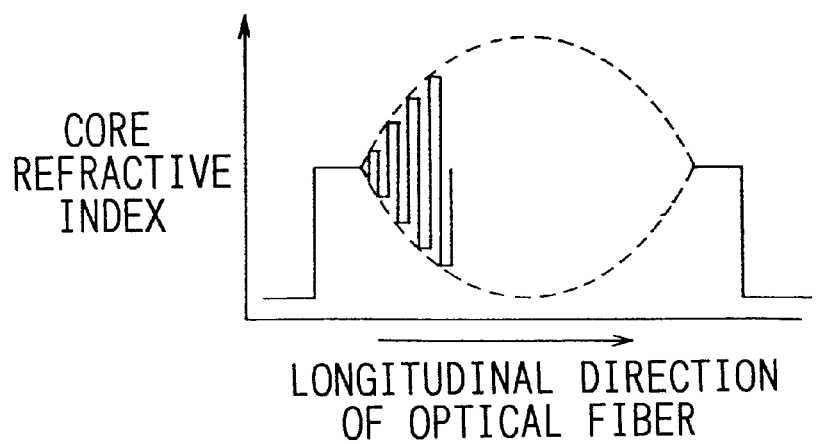
FIG. 17C is a graph showing the core refractive index distribution obtained by the overall irradiation step in the example of FIG. 17A.
Figure 18A:
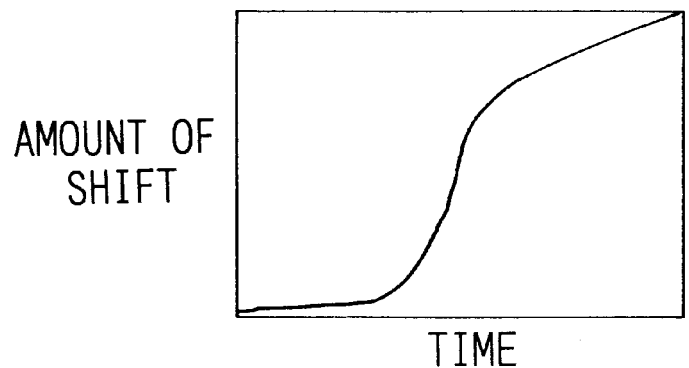
FIG. 18A is a graph showing another example of the shifting conditions of the shielding plate during the overall irradiation step of FIG. 11.
Figure 18B:
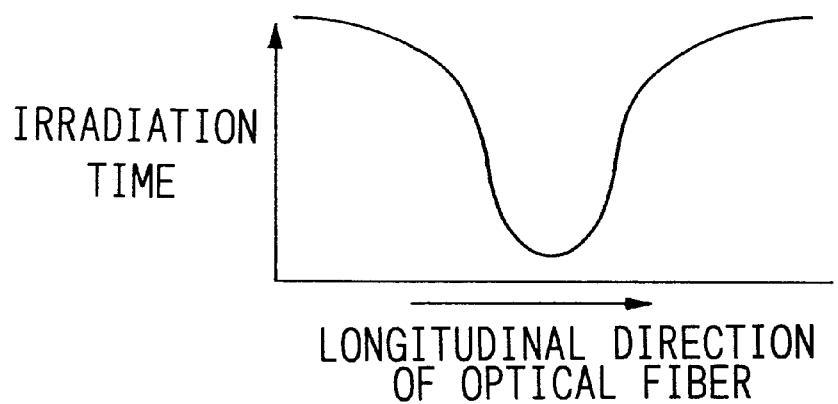
FIG. 18B is a graph showing the UV beam irradiation time distribution during the overall irradiation step in the example of FIG. 18A.
Figure 18C:
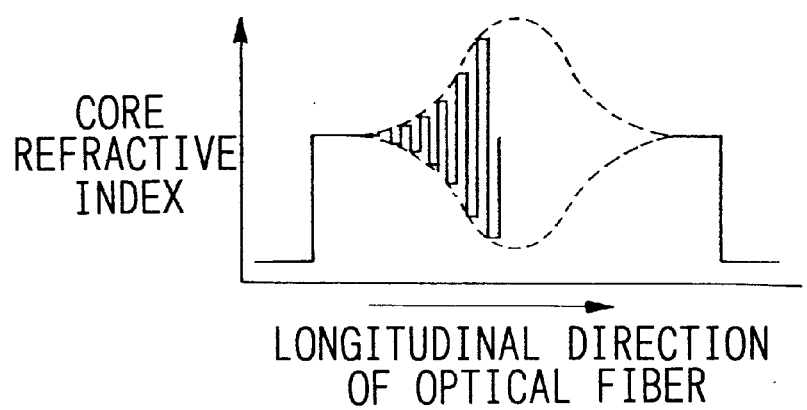
FIG. 18C is a graph showing the core refractive index distribution obtained by the overall irradiation step in the example of FIG. 18A.

Additionally, if the first shielding plate 33 is shifted while gradually increasing then gradually decreasing the shifting speed as shown in FIG. 16A, the UV beam irradiation time distribution along the longitudinal direction of the optical fiber 31 forms a curve as shown in FIG. 16B. The core refractive index change in the grating portion also changes to form a curve along the longitudinal direction of the optical fiber 31 as indicated by the dashed line in FIG. 16C.

Additionally, when the grating portion is formed while performing apodization as shown in FIGS. 15A–15C and 16A–16C, overall exposure should subsequently be performed while performing apodization as shown in FIGS. 17A–17C and 18A–18C using a second shielding plate 35.

FIGS. 17A–17C and FIGS. 18A–18C show examples of shifting conditions of the second shielding plate 35 used for the overall exposure process in the above example, and the corresponding irradiation time distributions and core refractive index change distributions.

By performing an overall exposure as shown in FIGS. 17A–17C and FIGS. 18A–18C, it is possible to obtain core refractive index change distributions which complement those of FIGS. 15A–15C and FIGS. 16A–16C, so as to make the effective refractive index constant along the longitudinal direction of the optical fiber.

Figure 19:
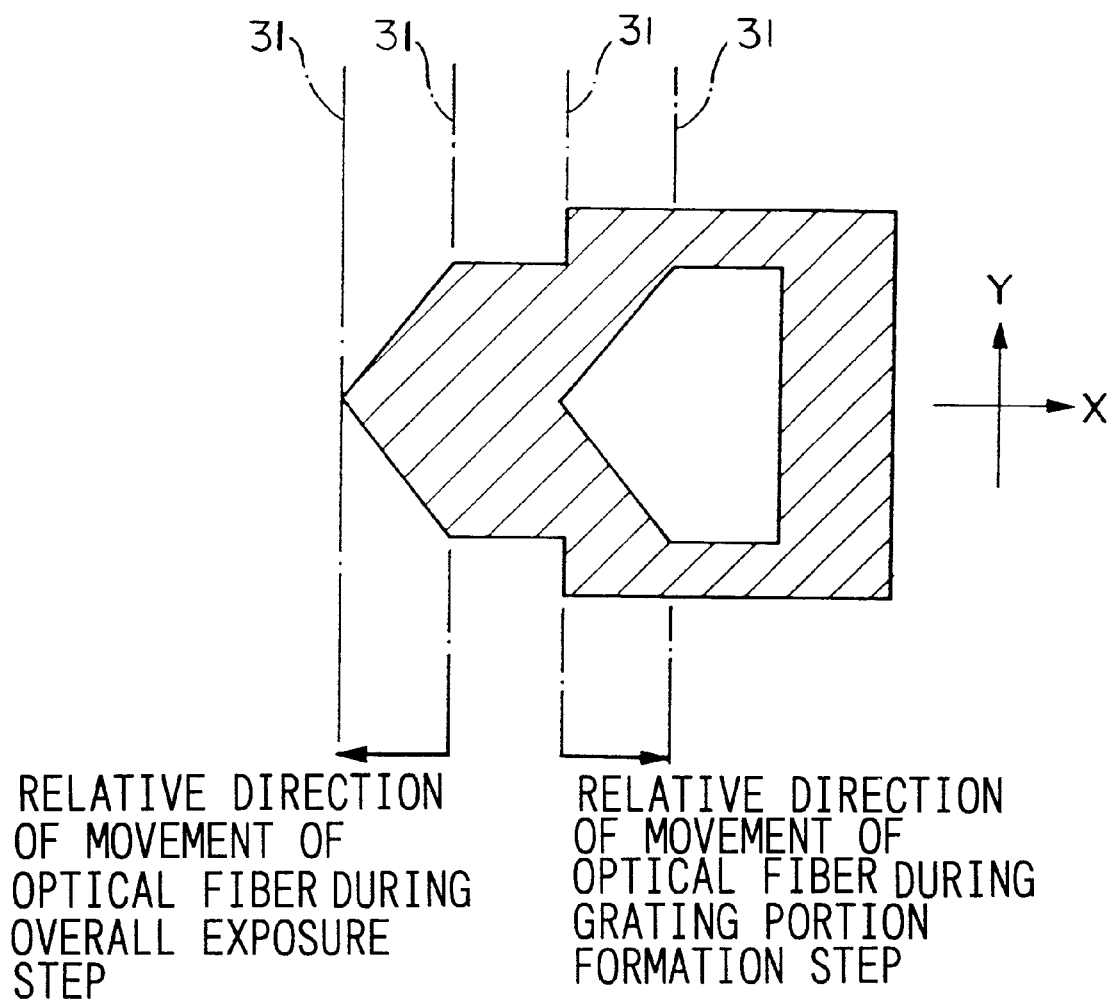
FIG. 19 is a plan view showing another example of the shielding plate according to the third embodiment of the present invention.
Figure 20:
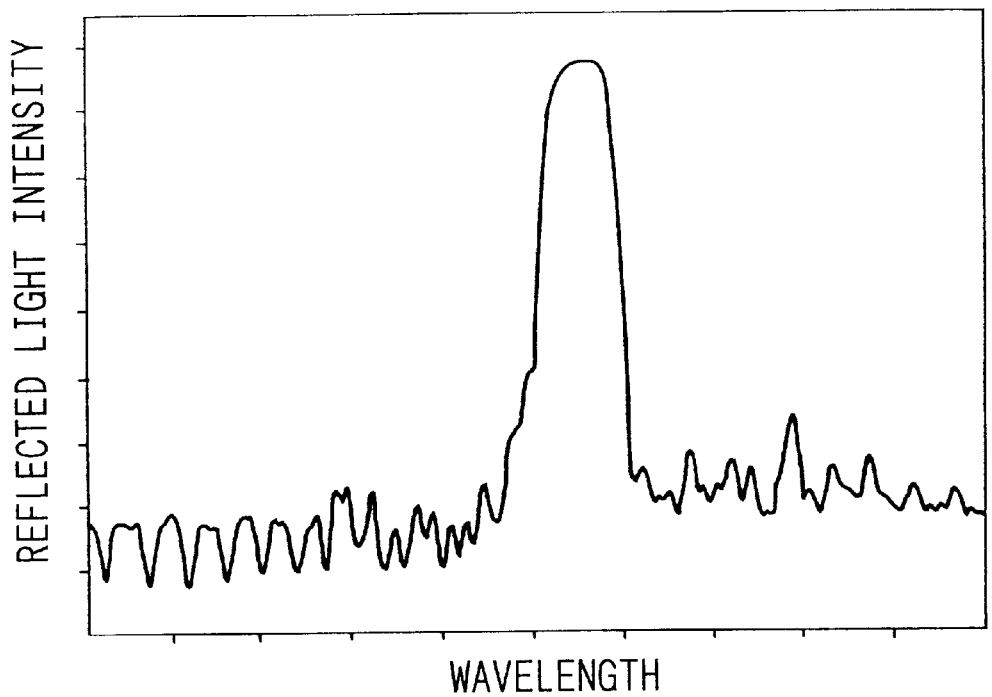
FIG. 20 is a graph showing an example of the properties of a reflective mode-coupled optical waveguide grating.
Figure 21:
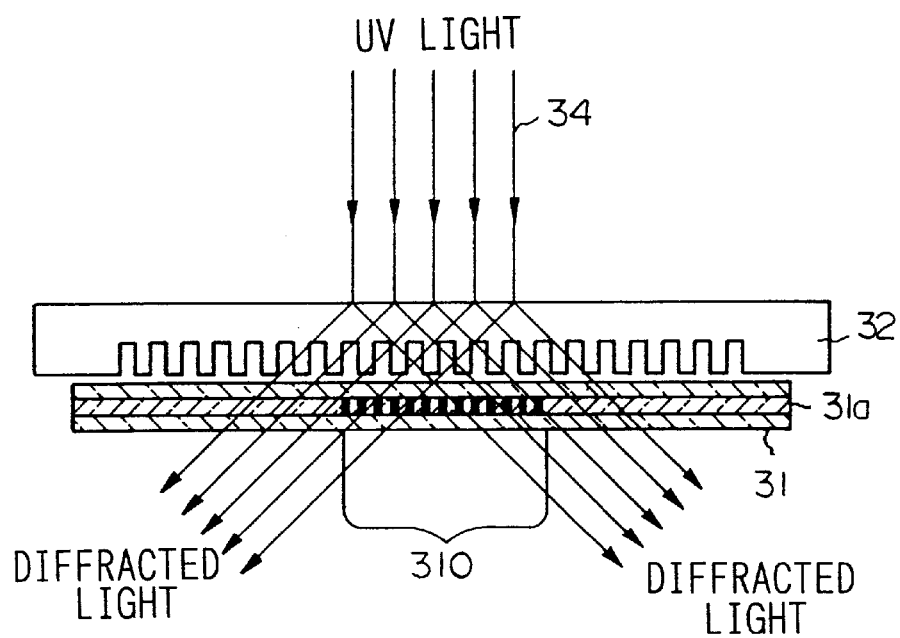
FIG. 21 is a diagram for explaining an example of a grating portion formation step using a phase mask.
Figure 22:
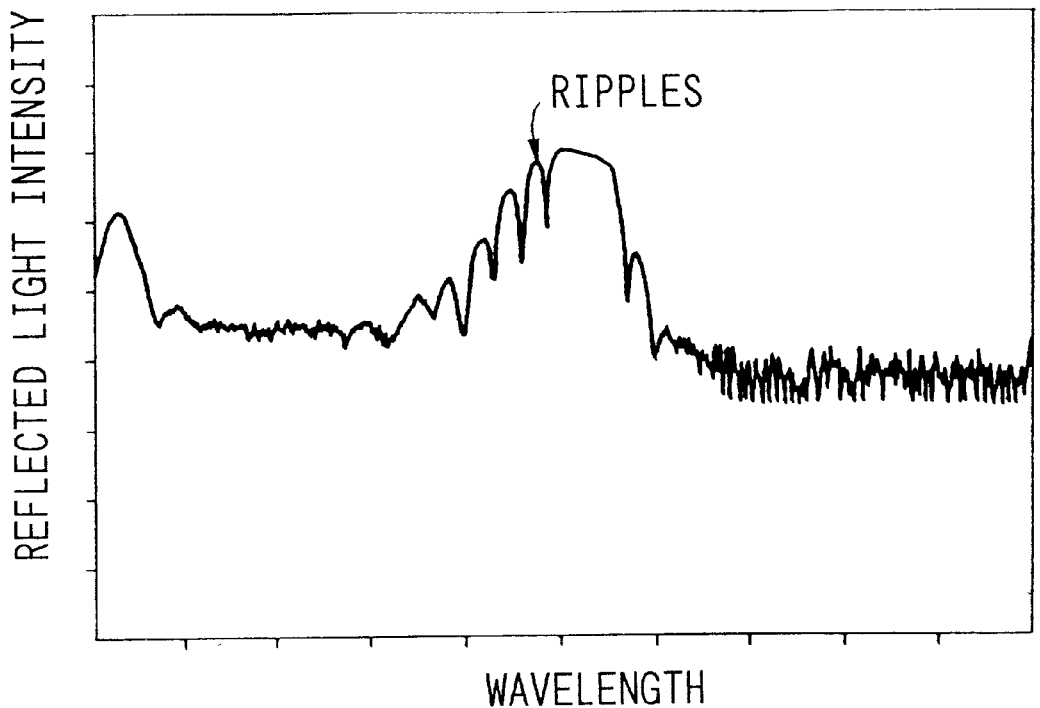
FIG. 22 is a graph showing an example of the occurrence of anomalous ripples in a reflective mode-coupled optical waveguide grating.
Figure 23:
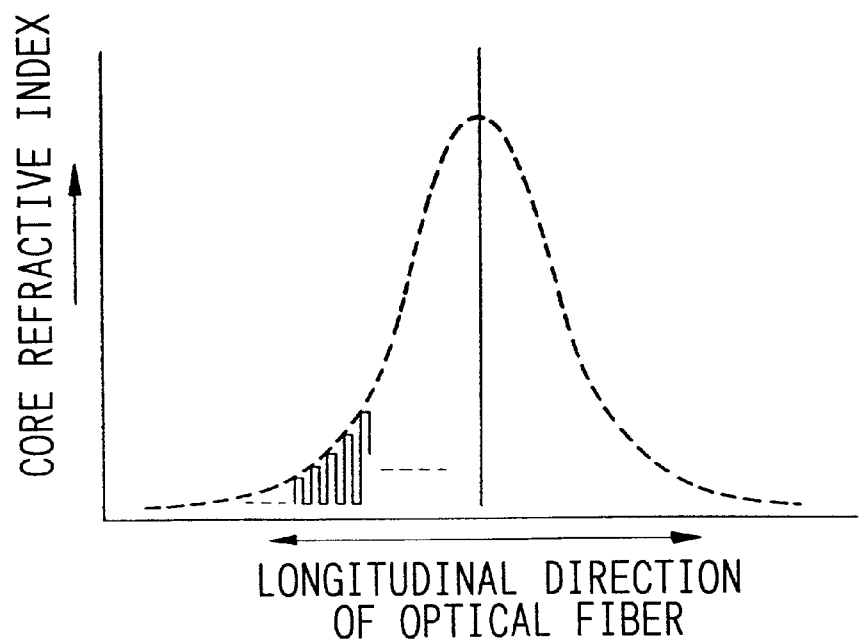
FIG. 23 is a graph for explaining apodization.

Additionally, while the first shielding plate 33 and the second shielding plate 35 are separate parts in the above example, these shielding plates can be united to form a single shielding plate having both a projecting portion and an indented portion as shown in FIG. 19, which can be used for both the grating portion formation process and the overall exposure process.

Additionally, while the first shielding plate 33 is initially positioned such that the optical fiber 31 is below the straight end 33b side opposite to the indented portion 33 of the first shielding plate 33 and the straight end 33b of the first shielding plate 33 is shifted away from the optical fiber 31 during irradiation with the UV beam 34 in the grating formation process of the above example, the shifting direction of the first shielding plate 33 can be in the opposite direction.

That is, apodization can also be performed according to a process wherein the first shielding plate 33 is initially positioned such that the depth direction (X direction) of the indented portion 33a and the longitudinal direction (Y direction) of the optical fiber 31 are perpendicular and the optical fiber 31 is to the outside of the indented portion 33a, then the optical fiber 31 is irradiated with the entire UV beam 34. Then, while irradiating with the UV beam 34, the first shielding plate 33 is shifted along the depth direction of the indented portion 33a such that the straight end 33b of the first shielding plate 33 approaches the optical fiber 31.

Similarly, the second shielding plate 35 can be made to shift in the opposite direction to that of the above example in the overall exposure process as well.

Furthermore, the UV beam irradiation time distribution along the longitudinal direction of the optical fiber 31, i.e. the core refractive index change distribution along the longitudinal direction of the optical fiber 31, can also be controlled by changing not only the shifting speeds of the first shielding plate 33 and the second shielding plate 35, but also by changing the shapes of the first shielding plate 33 and the second shielding plate 35.

The shapes of the first shielding plate 33 and the second shielding plate 35 should be such as to have projecting portions or indented portions which result in changes in the sizes of the portions which overlap the optical fiber when these are positioned above the optical fiber and moved, and these shapes should be determined as appropriate depending on the desired core refractive index change distribution.

Additionally, while a method for forming the grating portion using a phase mask was used in the above example, it is possible to apply this process of apodization by shifting shielding plates for other grating portion formation methods as well.

Finally, while an optical fiber was used as an optical waveguide in order to produce an optical fiber grating in the above example, the optical waveguide does not need to be an optical fiber, and the production method of the third embodiment can just similarly be applied to planar optical waveguides.

We claim:

1. A method of producing optical waveguide gratings comprising:

a grating portion formation step of forming a grating portion in which a core refractive index periodically changes in an optical waveguide having said core composed of a material with a refractive index which changes when exposed to UV light by irradiating the optical waveguide with a UV beam from a UV light source; and an overall exposure step of causing the core refractive index to change in the entire grating portion by irradiating the entire grating portion with a UV beam after formation of the grating portion;

wherein the UV beam exposure time of the optical waveguide is varied along the longitudinal direction of the optical waveguide during said grating portion formation step so that the center of the grating portion in the longitudinal direction of the optical waveguide is the longest and the UV beam exposure time decreases towards both ends of the grating portion by positioning a first shielding plate between the optical waveguide and UV light source and moving the first shielding plate while irradiating with the UV beam; and the UV beam exposure time of the optical waveguide is varied along the longitudinal direction of the optical waveguide during said overall exposure step so that the center of the grating portion in the longitudinal direction of the optical waveguide is the shortest and the UV beam exposure time increased towards both ends of the grating portion by positioning a second shielding plate between the optical waveguide and the UV light source and moving the second shielding plate while irradiating with the UV beam.

2. A method of producing optical waveguide gratings in accordance with claim 1, wherein the first shielding plate is a flat plate having a V-shaped indented portion on one end, the first shielding plate is positioned such that the depth direction of the indented portion is perpendicular to the longitudinal direction of the optical waveguide, and the direction of movement of the first shielding plate is the depth direction of the indented portion; and the second shielding plate is a flat plate having a V-shaped projecting portion on one end such as to complement the shape of the first shielding plate, the second shielding plate is positioned such that the height direction of the projecting portion is perpendicular to the longitudinal direction of the optical waveguide, and the direction of movement of the second shielding plate is the height direction of the projecting portion.

3. A method of producing optical waveguide gratings comprising:

a grating portion formation step of forming a grating portion in which a core refractive index periodically changes in an optical waveguide having said core composed of a material with a refractive index which changes when exposed to UV light by irradiating the optical waveguide with a UV beam at predetermined periods; and an overall exposure step of causing the core refractive index to change in the entire grating portion so as to allow adjustment of the central wavelength of the optical waveguide by irradiating the entire grating portion with a UV beam after formation of the grating portion;

wherein the optical waveguide is hydrogenated prior to said grating portion formation step, and the optical waveguide is dehydrogenated after formation of the grating portion and before said overall exposure step.

4. A method of producing optical waveguide gratings comprising:

a grating portion formation step of forming a grating portion in which a core refractive index periodically changes in an optical waveguide having said core composed of a material with a refractive index which changes when exposed to UV light by irradiating the optical waveguide with a UV beam at predetermined periods; and an overall exposure step of causing the core refractive index to change in the entire grating portion so as to allow adjustment of the central wavelength of the optical waveguide by irradiating the entire grating portion with a UV beam after formation of the grating portion;

wherein the UV beam irradiation conditions are controlled while monitoring the rejection of the optical waveguide during said grating portion formation step, and the UV beam irradiation conditions are controlled while monitoring the central wavelength of the optical waveguide during said overall exposure step.

* * * * *